US010469198B2

(12) United States Patent
Axmon et al.

(10) Patent No.: US 10,469,198 B2
(45) Date of Patent: Nov. 5, 2019

(54) PROBING FOR INCREASED CAPACITY IN RELIABLE LOW-LATENCY COMMUNICATION

(71) Applicant: Telefonaktiebolaget LM Ericsson (publ), Stockholm (SE)

(72) Inventors: Joakim Axmon, Limhamn (SE); Peter Alriksson, Hörby (SE); Niklas Andgart, Södra Sandby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 111 days.

(21) Appl. No.: 15/565,760

(22) PCT Filed: Apr. 29, 2015

(86) PCT No.: PCT/EP2015/059342
§ 371 (c)(1),
(2) Date: Oct. 11, 2017

(87) PCT Pub. No.: WO2016/173645
PCT Pub. Date: Nov. 3, 2016

(65) Prior Publication Data
US 2018/0123732 A1 May 3, 2018

(51) Int. Cl.
H04W 52/02 (2009.01)
H04L 1/00 (2006.01)
H04L 1/18 (2006.01)

(52) U.S. Cl.
CPC .......... H04L 1/0033 (2013.01); H04L 1/0003 (2013.01); H04L 1/0005 (2013.01); H04L 1/0009 (2013.01); H04L 1/0011 (2013.01); H04L 1/1812 (2013.01); H04L 1/1825 (2013.01)

(58) Field of Classification Search
None
See application file for complete search history.

(56) References Cited

U.S. PATENT DOCUMENTS 8,542,604 B2    9/2013  Nabetani et al.
8,861,363 B2 * 10/2014  Steinberger ........... H04L 1/0003
                                                     370/236
(Continued)

FOREIGN PATENT DOCUMENTS

JP    2005244685 A    9/2005
JP    2007124467 A    5/2007
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.12.0, Mar. 2014, 1-127.
(Continued)

Primary Examiner — Jay P Patel
(74) Attorney, Agent, or Firm — Murphy, Bilak & Homiller, PLLC

(57) ABSTRACT

A method is proposed for adjusting transmission properties associated with data transfer in time slots of predetermined length, the method comprises transmitting a first transport block S101 using a set of transport transmission properties to a receiving node. A probing block S102 is transmitted to the receiving node using a set of probing transmission properties comprising a reduced robustness in relation to the set of transport transmission properties. The set of transport transmission properties is reconfigured for further transport blocks based on information communicated by the receiving node indicative of success of decoding of the probing block by the receiving node.

46 Claims, 10 Drawing Sheets

(56) References Cited

U.S. PATENT DOCUMENTS

| | | | | |
|---|---|---|---|---|
| 2006/0046659 | A1* | 3/2006 | Haartsen | H04B 17/382 |
| | | | | 455/67.11 |
| 2012/0008510 | A1* | 1/2012 | Cai | H04B 7/0404 |
| | | | | 370/252 |
| 2012/0063439 | A1 | 3/2012 | Seok | |
| 2014/0334392 | A1* | 11/2014 | Gage | H04L 5/0092 |
| | | | | 370/329 |
| 2014/0362732 | A1* | 12/2014 | Landstrom | H04L 25/0226 |
| | | | | 370/254 |
| 2015/0334579 | A1* | 11/2015 | Lin | H04W 48/14 |
| | | | | 370/329 |
| 2015/0334653 | A1* | 11/2015 | Ang | H04W 28/0221 |
| | | | | 370/311 |
| 2016/0164580 | A1* | 6/2016 | El-Najjar | H04B 7/0413 |
| | | | | 375/267 |

FOREIGN PATENT DOCUMENTS

| | | |
|---|---|---|
| JP | 2007335994 A | 12/2007 |
| JP | 5986932 B2 | 8/2016 |
| RU | 2011139711 A | 4/2013 |
| WO | 2006107886 A2 | 10/2006 |
| WO | 2011112127 A1 | 9/2011 |

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.7.0, Mar. 2015, 1-659.

* cited by examiner

PROBING FOR INCREASED CAPACITY IN RELIABLE LOW-LATENCY COMMUNICATION

TECHNICAL FIELD

The present disclosure relates to methods of transmitting and receiving transmission in a radio network. More particular, the disclosure concerns a method adjusting transmission properties associated with data transfer. Further, the disclosure is related to a transmitting and a receiving node in a radio network and to a corresponding computer program.

BACKGROUND

Modern mobile communication systems make use of several communication standards known as the Universal Mobile Telecommunication System (UMTS) and Long Term Evolution, LTE. The third Generation Partnership Program, 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed using OFDM as modulation type. LTE is also able to operate in different frequency bands and can operate in at least Frequency Division Duplex (FDD) and Time Division Duplex (TDD) modes.

Hybrid Automatic Repeat reQuest (HARQ) is an integral part of the 3G and 4G standards that allows reliable communication between a wireless device and a network node by means of incremental redundancy. The transport block to be transmitted is subjected to forward error correction encoding by which redundancy is introduced. The number of bits increases due to the introduced redundancy, but not all bits are sent at the same time. The resulting bits are segmented into several redundancy versions, where each such redundancy version comprises the same set of information bits, but different sets of parity bits. The redundancy versions are further punctured before being sent in order to fit it within the given allocation (one or more resource block pairs). "Puncturing" in this regard is a term used in coding theory, in which some of the parity bits are removed after encoding with an error-correction code. How much is punctured is depending on how many bits (information plus redundant bits) that can be carried in the allocation, which further is depending on the allocation bandwidth, the modulation (e.g. QPSK, 16QAM, 256QAM) in use, and the presence of broadcasted signals and channels in the allocated bandwidth. The ratio between the information bits and information bits plus redundant bits in a transport block is referred to as code rate. In good radio conditions, the code rate can be close to 1 (very little redundancy), and it decreases with worsened radio conditions (gradually increasing redundancy of information). The combination of code rate and modulation type is referred to as Modulation and Coding Scheme, or short MCS. MCS and other parameters affecting the transmission robustness are referred to as transmission properties.

In practice, incorrectly received coded data blocks are often stored at the receiver rather than discarded, and when the re-transmitted block is received, the two blocks are combined. While it is possible that two given transmissions cannot be independently decoded without error, it may happen that the combination of the previously erroneously received transmissions gives us enough information to correctly decode. This approach is called Hybrid ARQ with soft combining, in which incremental redundancy is a possibility for such soft combination.

Incremental redundancy allows the receiving node, for example a user device, to attempt to receive and decode a first redundancy version of the transport block. In case it fails, it receives a second redundancy version of the transport block, which is combined with the first received block and again decoded. In case a re-transmission of the same transport block is required, such occur normally at minimum of 8 ms distance. Under some circumstances, features such as TTI bundling are used, by which several redundancy versions are transmitted in subsequent subframes without waiting for feedback on whether a previous redundancy version was successfully decoded.

The receiving entity provides acknowledgment to the transmitting entity on whether it decoded the transport block successfully (ACK) or whether it failed (NACK). The transmitting entity then can decide on whether to transmit another redundancy version for the same block, or send a redundancy version for a next transport block.

In case the maximum number of retransmissions is reached without the receiving entity being able to decode the transport block, it will be detected by higher layers e.g. Radio Link Control, RLC, generally within 50-100 ms that a Protocol Data Unit (PDU) is missing and a retransmission is requested for all transport blocks that comprise the RLC PDU, even those that may have been successfully decoded. This is referred to as Automatic Repeat request (ARQ) and has considerably larger latency than HARQ retransmissions.

In a LTE network, a wireless device (in LTE referred to as a User Equipment, UE) carries out measurements to provide indications to the base station (in LTE eNodeB) on the perceived radio propagation conditions in what is called Channel Quality Indicator (CQI) reporting. Based on the reporting, the base station can roughly decide on the Modulation and Coding Scheme to use for communication with the UE. An example of mapping between CQI and MCS is shown in Table 1 below, retrieved from 3*GPP TS* 36.213 *V*10.12.0 *section* 7.2.3. In low channel quality (low CQI index) more forward error correction encoding is needed for successful decoding of the information bits, and vice versa in high channel quality i.e. high CQI index. Hence, at high CQI the throughput of information bits can be made higher than at low CQI.

TABLE 1

4-bit CQI table from 3GPP

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |

TABLE 1-continued 4-bit CQI table from 3GPP

| CQI index | modulation | code rate × 1024 | efficiency |
|---|---|---|---|
| 14 | 64QAM | 873 | 5.1152 |
| 15 | 64QAM | 948 | 5.5547 |

In order to get a good system throughput, the eNodeB carries out link adaptation matching each UE's reported channel quality to an MCS that provides the right balance between system throughput and throughput for the individual user. The MCS is indicated to the UE in the Downlink Control Information, DCI provided over Physical Data Control Channel, PDCCH as shown in Table 2 retrieved from 3GPP TS 36.213 V10.12.0 section 7.1.7.1.

TABLE 2

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In addition to CQI reporting, eNodeB typically has an outer loop that tunes the MCS value based on ACK/NACK reports to a suitable value giving a BLER (ratio between NACKs and total number of received or expected ACK/NACKs) of e.g. 10%. Besides catering for flexibility in which target BLER is used (e.g. 1%, 10%, 30%), it also solves the problem that each UE model or even UEs of the same model may have an individual bias in the reported CQI. The base station thus maintains a UE-specific CQI offset which it tunes to give the desired BLER target.

In case of UEs with extreme requirements on reliable low-latency communication, e.g. residual BLER in the order of $10^{-9}$ and latency in the order of 20 ms (i.e., at most one transport block per billion is allowed to have latency exceeding 20 ms), block errors on MAC level have to be avoided as far as possible. Each block error increases the risk of a failure in the MAC HARQ combining, resulting in a RLC retransmission (RLC ARQ), typically associated with a latency of 100 ms or more. This is due to that RLC has to wait for some time after it has detected that a package has been delivered out-of-order (configurable by the network operator) before it can conclude that a MAC PDU has been lost and can request a retransmission.

The existing HARQ implementation only supports binary reporting on whether a transport block has been correctly decoded, i.e. ACK or NACK. This means that the operation of determining and compensating for the unique CQI bias cannot be done without increasing the risk for introducing block errors on MAC HARQ level that may lead to increased latency since each unsuccessful HARQ retransmission takes at least an additional 8 ms. The reason is that when a block is correctly decoded, the positive acknowledgment ACK will not tell the sender, how close to its limit the decoding operation was, i.e. if there were correctable error or not.

The existing implementation makes it hard for the network node to identify the CQI bias, because such operation may lead to violation of latency requirements and/or reliability requirements. As a result, eNodeB needs to configure DL and UL transmissions using a much more robust MCS than called for, in order not to risk introducing delays and/or block errors on RLC level. More robust MCS leads to a higher usage of resources for the particular UE than necessary, with fewer resources available for other UEs in the cell, thereby reducing the overall system throughput.

SUMMARY

Consequently, there is a need for a method offering a more flexible approach.

A method for adjusting transmission properties associated with data transfer is performed in a transmitting node of a radio network. The method comprises transmitting a first transport block using a set of transport transmission properties to a receiving node. A probing block is transmitted to the receiving node using a set of probing transmission properties resulting in a reduced robustness in relation to the set of transport transmission properties used for the first transport block. The method also comprises reconfiguring the set of transport transmission properties for further transport blocks based on information communicated by the receiving node indicative to a success of decoding of the probing block by the receiving node. The proposed method provides a possibility to reconfigure the transmission properties in order to free resources while maintaining the requirements on reliable low-latency communication. This is achieved by transmitting a probing block and evaluating the feedback indicative of a success of decoding of the probing block.

In a further aspect, the method may also comprise transmitting a second transport block using the transport transmission properties after transmitting the probing block. In other words, the probing block is transmitted between the first and the second transport blocks. Alternatively or additionally, information indicative of a successful decoding of the first transport block may also be received. This will allow to flexible perform probing by transmitting the probing block during normal data transfer.

In an aspect, the reconfiguring comprises adjusting at least a part of the set of transport transmission properties to match a respective part of the set of probing transmission properties. Alternatively, at least a part of the set of transport transmission properties are adjusted causing and/or resulting in a transmission robustness which is lower than a transmission robustness of the set of transport transmission properties used in transmitting the first transport block but higher than a transmission robustness of the set of probing transmission properties. In this regard, transmission properties may comprise for example a modulation and coding scheme, a Radio Access Technology, one or more Multiple Input Multiple Output transmission modes, a Beam forming, a Pre-coding Matrix, a Transmission Power or any other transmission parameter which affects the robustness of the transmission.

In an aspect, the probing block comprises payload data which is also included in a transport block using the set of transport transmission properties. In other words, the probing block contains the same payload data, which already was or is scheduled to be transmitted to the receiving node in a transport block. The payload in the probing block may be discarded after decoding the probing block and acknowledging successful decoding.

In a further aspect, the probing block comprising the payload data equal to the payload of a transport block is transmitted after receiving a communication by the receiving node indicative to a successful decoding of said transport block. As the payload included has already been decoded successfully by the receiving node, the receiving node is able to discard the probing block irrespectively whether the probing block is decoded correctly, thus only temporary allocating resources for the probing. In some aspects, transition of the probing block is immediately after or prior to transmission of a transport block. This will enable the probing block to be sent without waiting for acknowledgement of reception of payload data.

In yet another aspect, the method further comprises scheduling payload data to be sent in respective time slots and scheduling the probing block to be transmitted during one of those time slots. To compensate for the time slot used to transmit the probing block, the payload data scheduled in the one time slots is merged with payload data scheduled in a subsequent time slot. The second transport block is generated using the merged payload. In an aspect, the subsequent time slot is the time slot immediately following the one time slot. This will allow on average an continuous data transfer will at the same time enable probing.

In another aspect, each of the transport blocks comprises a first identifier associated with the receiving node and the probing block comprises a second identifier associated with the receiving node. In an aspect, a third transport block is transmitted during a time, in which the probing block is transmitted. The third transport block and the probing block may contain different identifiers in this regards. Hence, two identifiers associated with the same receiving node are simultaneously used, one for regular data flow, the other for the probing. This results in an uninterrupted regular data flow to the receiving node.

In an aspect, the probing transmission properties is selected in response to a Block Level Error Rate, said required Block Level Error Rate biased to a Block Level Error Rate in a channel quality indicator communicated by the receiving node. This approach may allow to fulfil latency and BLER requirement by the receiving node in a resource efficient way.

The proposed method can be used in a base station as well as in user equipment in a radio network environment. Consequently, in an aspect, the step of transmitting probing blocks is performed in response to a respective request by the receiving node. In another aspect, a list of scheduled time slots is received for which at least one of the first and second transport block or the probing block is to be transmitted. In an example, both aspects are applied to a user device as transmitting node in a radio network.

In another aspect, a method for processing quality information on transport blocks is proposed. Said method is performed in a receiving node of a radio network and comprises receiving a first transport block using a set of transport transmission properties. A probing block is received using a set of probing transmission properties comprising a reduced robustness in relation to the set of transport transmission properties used for the first transport block. In response to decoding the probing block, an acknowledgment is communicated by the receiving node and the decoded probing block is discarded.

As the probing block is discarded after decoding it, payload data is not processed at higher levels, thus saving processing time and efforts. Particularly, the probing block can be discarded irrespectively of the outcome of the decoding process, i.e. whether the block has been successfully decoded or not. In an aspect, information indicative of successful decoding the first transport block is communicated. Further, a second transport block is received after reception of the probing block. In other words, the probing block is received between receiving the first and second transport blocks, respectively. In this regard, the second transport block may comprise merged payload data, said merged payload data comprising payload data scheduled for transmission during a time, in which the probing block was transmitted and payload data scheduled for transmission after the transmission of the probing block.

In an aspect, the probing block comprises payload data which was already included in a transport block. Alternatively, the probing block may contain predefined payload data. Despite other measures to evaluate if the probing block has been decoded correctly, known payload data enables the receiving node the quickly perform a further consistency check before discarding it. In order to further increase robustness and reduce processing overhead, an acknowledgment for data in a received transport block prior to receiving said data in the probing block may be transmitted.

In some other aspects, each transport block comprises a first identifier associated with the receiving node and the probing block comprises a second identifier associated with the receiving node. Using two identifiers associated with the receiving node enables the receiving node to receive transport blocks in a substantial continuous manner without being interrupted by reception of probing blocks. In an aspect, a third transport block can be received during the time, in which the probing block is received, wherein the blocks may have different identifiers.

Both methods can be applied in different radio network standard. For example, a first node in a radio network using radio network standard is a configured to perform one or more aspects of the method for adjusting transmission properties, while a second node in the radio network is configured to perform the method for processing quality information. A computer program comprising computer program code may cause a node in a radio network to perform one or more of the above aspects when executed in a programmable controller of said node. In addition, the first, the second and the probing block can, for example be transmitted in a channel for payload data transfer, in particular in the physical downlink shared channel, PDSCH or the physical uplink shared channel, PUSCH in accordance to the LTE standard. To this date, the current LTE standard is release 12, series 36 from March 2015 and can be found at ftp://ftp.3gpp.org/Specs/2015-03/Rel-12/36_series/, incorporated herein by reference.

In yet another aspect a transmitting node in a radio network comprises a data module, a probing module, a communication module and a transmission property module. The data module is configured to provide a first and a second transport block comprising payload data using a set of transport transmission properties. The probing module is configured to provide a probing block using a set of probing transmission properties, said probing transmission properties comprising a reduced robustness in relation to the set of transport transmission properties. The communication module is configured to transmit the first and second transport blocks in respective time slots and the probing block in a time slot between the respective time slots to a receiving node. The transmission property module is configured to reconfigure the set of transport transmission properties in response to a successful decoding acknowledgment for the probing block provided by the receiving node.

In accordance with this aspect, the transmitting node is enabled to adjust the set of first transmission parameter to a less robust transmission, which however still fulfils the requirements on latency and other transmission quality parameters. Consequently, available resources will be used more efficiently and the transmission properties can be changed more flexible in response to a changing environment. In a further aspect, the transmission property module is configured to adjust at least a part of the set of transport transmission properties to match a respective part of the set of probing transmission properties. As a result, the transmitting node makes use of the transmission properties evaluated and tested during any probing operation.

In an aspect, the probing module of the transmitting node is configured to provide the probing block comprising payload data included in one of the transport blocks. The communication module may be configured in yet another aspect to transmit the probing block after reception of a positive acknowledgment of a transport block containing said payload data by the receiving node. This may provide some form of prioritization to the extent that known payload of probing data is used, for which a positive acknowledgment is received. Said payload is known by the receiving node and can therefore be discarded irrespectively, whether the probing block is successfully decoded or not.

A further aspect is related to the transmission of transport blocks in a scheduled manner. In this aspect, the data module comprises a scheduler configured to schedule payload data to be sent in respective time slots. The data module also comprises a merger configured to merge payload data scheduled to be sent during the transmission of the probing data and payload data scheduled in a subsequent time slot. In this regard, the merger may be configured to merge the payload and schedule the payload for transmission, particular in the time slot immediately following the transmission of the probing data. The bundler provides a transport block comprising said bundled payload data. In accordance with this aspect, the transmitting node may provide a probing functionality, in which probing blocks are scheduled to be sent during predefined times. To enable a substantial continuous transmission of payload, a merger is provided, merging payload data in cases in which payload data is scheduled during the times, in which the probing block is scheduled. In other words, the merger provides two payload packets to be merged in one transport block for transmission.

In another aspect, the data module is configured to provide transport blocks having a first identifier associated with the receiving node and the probing block having a second identifier associated with the receiving node. The communication module may be configured to transmit a third transport block and the probing block at the same time. To associate two identifiers with the same receiving node enables the transmitting node to substantial continuously transmit transport blocks without interruption of such transmission by a probing.

In some occurrences, the communication module is configured to transmit the probing block immediately prior or after a transport block comprising the same payload data as the probing block. In some other aspects, the probing module is configured to provide a request to the to discard the probing block after communicating a decoding acknowledgment.

Another aspect refers to a receiving node in a radio network. The node comprises a decoding module configured to decode a first and a second transport block to retrieve payload data using a set of transport transmission properties. A probing module is configured to decode a probing block using a set of probing transmission properties, said set of probing transmission properties having a reduced robustness in relation to the set of transport transmission properties. The probing module is further configured to discard the probing block after decoding and to provide an acknowledgment indicative to a decoding result. The receiving node also comprises a communication module configured to receive the first and second transport blocks and the probing block between the transport blocks from a transmitting node and transmit the acknowledgment to said transmitting node. The receiving node therefore only evaluates if the probing block is successfully decoded or not, but will discard the probing block after the decoding attempt. Consequently, the decoding process can be performed on lower layers resulting in reduced resource consumption for the probing.

In an aspect, the receiving node is configured to receive and decode the probing block associated with an identifier different to an identifier associated with transport blocks. The reception of a probing block with a different identifier enables the receiving node to substantial continuously receive transport blocks for processing.

In all aspects, the set of transmission properties may comprise one or more parameters of transmission quality or other settings influencing the transmission robustness. These aspects includes for example, a modulation and coding scheme, a Radio Access Technology, one or more Multiple Input Multiple Output transmission modes, a Beam forming, a Pre-coding Matrix or a Transmission Power.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

ABBREVIATIONS

Figure 1:
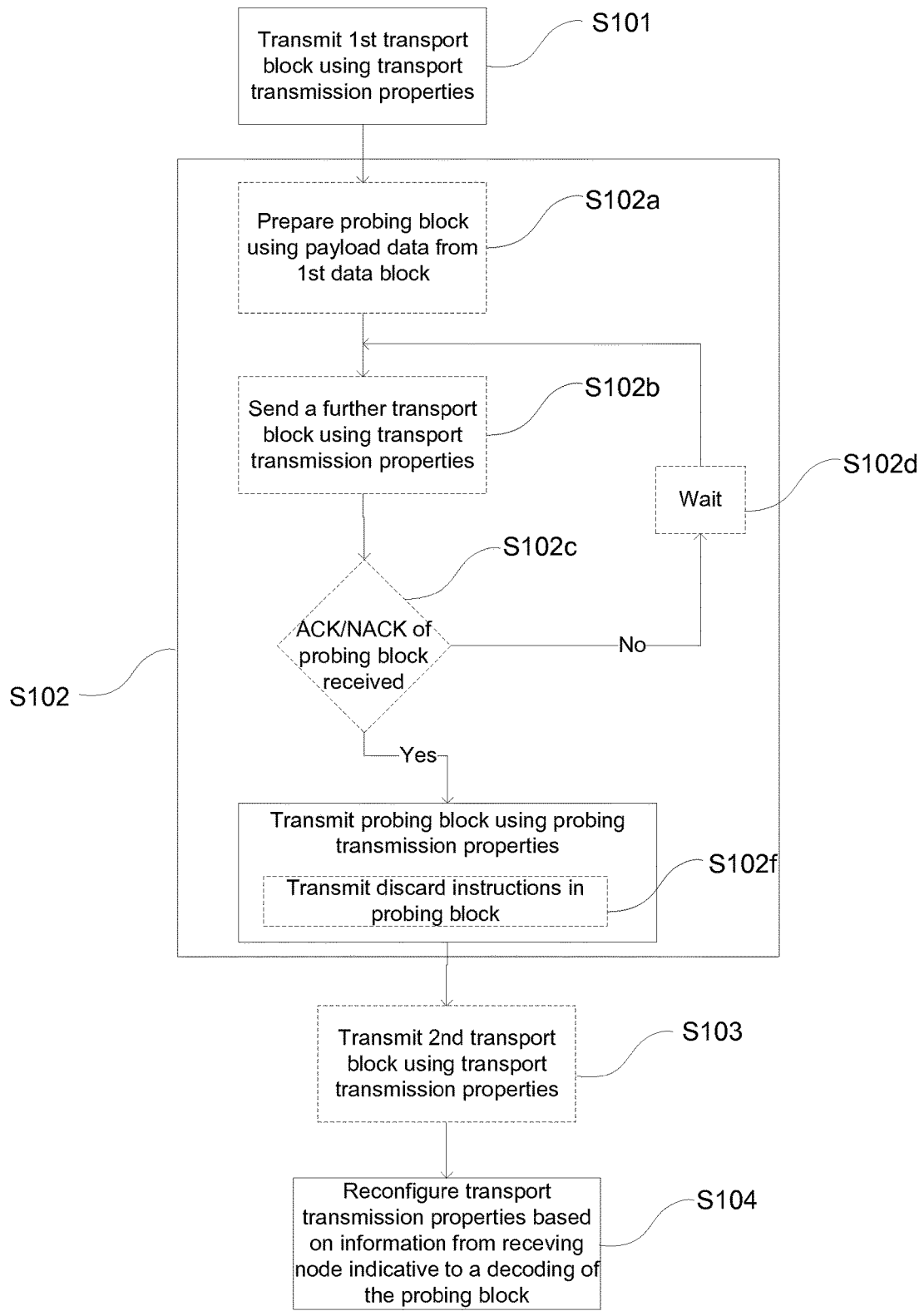
FIG. 1 illustrates a flowchart of several method steps in a radio network.

The following abbreviations represent a non-limiting list of abbreviations commonly used in the present disclosure. The disclosure may contain additional abbreviation, whose meaning and definition is described in the present disclosure at the appropriate place.
ACK Acknowledged
ARQ Automatic repeat request
BLER Block error rate
CQI Channel quality indicator
C-RNTI Cell Radio Network Temporary Identifier
CRS Cell specific reference signals
CSI Channel state information
DCI Downlink control information
DL Downlink
eICIC Enhanced ICIC
FFT Fast Fourier transformation
HARQ Hybrid automatic repeat request
ICIC Inter-cell interference coordination
LTE Long Term Evolution
MAC Medium ACcess layer
MCS Modulation and coding scheme
NACK Not Acknowledged
OFDM Orthogonal Frequency Division Modulation
PCFICH Physical control format indicator channel
PDCCH Physical downlink control channel
PDSCH Physical downlink shared channel
PHICH Physical HARQ indication channel
PHY Physical layer
PUCCH Physical uplink control channel
PUSCH Physical uplink shared channel
PDU Protocol data unit
QoS Quality of service
RLC Radio link control
SG Scheduling grant
SR Scheduling request
SRS Sounding reference signals
TTI Transmission time interval
UCI Uplink control information
UE User equipment
UL Uplink

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

For the purpose of illustrating the following embodiments, the disclosure refers to the modern telecommunication standard 3GPP/LTE as described and included in Series 36, release 12 from March 2015 of the 3gpp standards. Consequently, the terms used herein originate from the mentioned standard. However, the proposed and disclosed techniques, methods and devices are not restricted or limited this standard, but are generally applicable for all radio network or wireless communication standards (e.g. Wi-Fi, WCDMA, WiMax, UMB and GSM) as well as wired communication standards, whose apply similar principles of error correction and transmission parameter changes for achieving a reliable data transfer and resource management. Future radio network standards currently under early development may benefit from the disclosed embodiments and principles as do future revisions of the existing standards and variants therefrom. Throughout this description the terms transmitting and receiving nodes will be used. It is noted, that those terms shall not be restrictively construed to correspond to a specific entity. Rather, a basestation but also a user equipment can act as or implement a transmitting node. Likewise user equipment and/or basestation can act as or implement a receiving node.

It is also appreciated that the different Figures may comprise some operations which are illustrated with a solid border and some operations which are illustrated with a dashed border. The operations which are comprised in a solid border are operations which are comprised in a broader example embodiment. The operations which are comprised in a dashed border are example embodiments which may be comprised in, or a part of, or are further operations which may be taken in addition to the operations of the solid border example embodiments. It should be appreciated that the operations need not necessarily to be performed in disclosed order if not stated otherwise in this disclosure. Furthermore, it should be appreciated that not all of the operations need to be performed. The example operations may be performed in any suitable order and in any combination of the illustrated embodiments in the Figures.

Throughout this disclosure the terms transport blocks and probing blocks are used. It will be appreciated that any block (transport or probing) specified herein will be transmitted during a time period of specified length using a specific modulation and coding scheme, MCS and/or other appropriate transmission properties. The time period will be referred to as time slot or subframe. Subframes can be combined to frames where appropriate. The subframes are generally of the same length. The transport and/or probing blocks transmitted or received during said time slots generally comprise header information including one or more identifiers as well as payload information. Payload and header are encoded in response to the selected modulation and coding scheme to form the respective blocks. In cases where the amount of payload is lower than the amount fitting into the block (the MCS and the length of the subframe defines the amount of information to be communicated), padding information is added.

Modern radio networks, particularly wireless radio networks require several error correction and detection techniques for high and reliably data throughput, preferably on or close to a physical layer to avoid and reduce latency in the data transfer. In the radio network standard LTE such error correction comprises Hybrid Automatic Repeat reQuest (HARQ) techniques on the PHY and MAC level, i.e. layer 1 and 2 of the abstraction layer model for radio networks.

LTE uses specific HARQ techniques with soft combining, named Incremental redundancy. Incremental redundancy allows a node to attempt to send/receive and decode a first redundancy version of the transport block, and in case it fails, it sends/receives a second redundancy version of the transport block, which it combines with the first one in so called soft combining and tries to decode. (Re)-transmissions of the same transport block occur at minimum 8 ms distance unless features such as Transmission time interval, TTI, bundling are used, by which several redundancy versions are transmitted in subsequent sub frames without waiting for feedback on whether a previous redundancy version was successfully decoded.

The receiving node, wireless device or base station, provides feedback to the transmitting node on whether it decoded the transport block successfully, ACK, or whether it failed, NACK. The transmitting node then can decide on whether to transmit another redundancy version for the same block, or send a redundancy version for a next transport block.

The transmission properties used by the transmitting node to transmit transport blocks to the receiving node has been negotiated or recommended before the transmission is initiated. For this purpose, the receiving node reports a Channel Quality Indicator CQI used by the transmitting node to set the transmission properties. Amongst others, such transmission properties may contain a modulation and coding scheme, MCS. Based on the reporting, the transmitting node, most often a base station, or eNodeB can decide roughly which MCS to use for communication with the receiving node. In addition, the CQI includes information enabling the base station to set a BLER (i.e. the ratio between successfully received and decoded blocks vs. the total number of received blocks), upon which it may also tune the transmission properties to a suitable value.

The MCS selection by the network node (e.g. eNodeB) for DL and UL transmissions is largely based on CQI and ACK/NACK reported by the UE. Each UE may have an individual bias in the CQI reporting, which needs to be addressed by the network node. The network node adjusts an assumed UE-specific MCS offset until a particular BLER target is achieved, e.g. 10%.

As stated previously, block errors on MAC level have to be avoided as far as possible in cases of reliable low latency communication. As the existing HARQ implementation only supports binary reporting on whether a transport block has been correctly decoded, the operation of determining and compensating for the unique CQI bias cannot be done without increasing the risk for introducing block errors on MAC HARQ level. Consequently, the network node will configure DL and UL transmissions using a much more robust MCS than called for, not to risk introducing delays and/or block errors on RLC level.

Prior art reference WO 2011/112127 shows a method that checks a number of MCS settings or transmission properties, and adjusts channel quality estimates depending on whether the probing packets have been successfully received. Although this method does not need to wait for ACK/NACK reports of each individual probing packet before sending the next probing packet, the data transmission is interrupted during the probing session since several probing packets are sent consecutively.

The proposed solution offers a way to tune transmission properties and the robustness of the transmission without violating requirements on reliability and maximum latency. Particularly data transfer can continue and is not interrupted as in the prior art reference. As a result, capacity that otherwise would have been allocated for safety margin become available for other UEs and the system throughput will improve. The tuning and the search from less conservative transmission properties can be achieved without introducing artificial errors in the data transmission. Further it may be useful for the transmitter to know, how close to its limit in terms of physical layer capacity, the receiver is operating. For example it may be useful to know how many of the turbo decoder iterations are remaining when successfully decoding the block, or similar kind of metrics.

Figure 15:
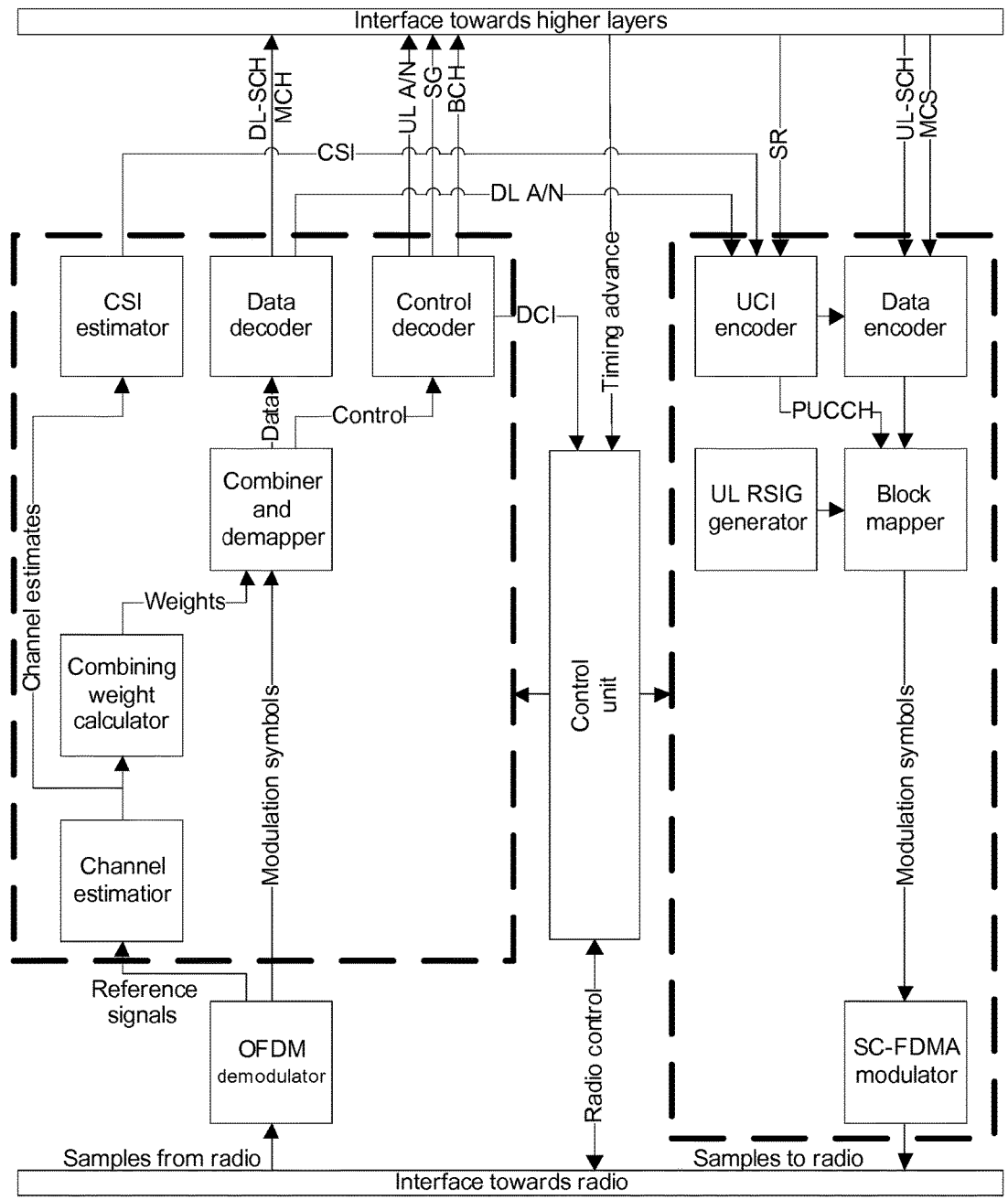
FIG. 15 is a sketch of LTE physical layer downlink and uplink processing.

A simplified sketch of the LTE physical layer in a UE is provided in FIG. 15. Samples are received from the radio, and subjected to an FFT in the OFDM demodulator. The output comprises resource elements carrying e.g. modulation symbols and reference signals. The reference signals are used by the Channel estimator for estimating the radio channel, and from the channel estimates and information on transmission mode and allocated bandwidth the optimum combining weights are derived by the Combining weight calculator. Some reference signals are also used by the CSI estimator for calculating channel state information (CSI, including COI) which is fed back to the network node. Received modulation symbols and combining weights are fed to the Combiner and demapper producing soft bits, which are further input to either of the decoders, depending on channel.

The UE first receives and decoded PDCCH (physical downlink control channel) to find downlink control information (DCI) providing information on allocations on PDSCH (physical downlink shared channel) as well as the transmission mode and modulation and coding scheme (MCS) in use, uplink allocations (scheduling grant; SG), uplink power control commands, etc. However before receiving it the UE decodes the physical control format indicator channel (PCFICH) which tells how large the control region is, i.e., how many of the initial OFDM symbols in the subframe are carrying PDCCH. Also, before the decoding the radio propagation channel needs to be estimated and combining weights be produced.

PDCCH is convolutional encoded and is decoded by the Control decoder. The decoded DCI is fed to the Control unit which is used for configuring the baseband. The Control decoder further outputs feedback from the network node on whether transmissions on the uplink were successfully decoded or not (UL ACK/NACK; UL A/N), and is also used for decoding the master information block (MIB) carried on PBCH (physical broadcast channel).

Once the DCI has been decoded, generally at a point in time about in the middle of the subframe, the PDSCH is next. Remaining reference signals in the subframe are used for improving the channel estimates, combining weights are tailored for the transmission mode in use, and then the received modulation symbols are combined and demapped, resulting in soft bits to be subjected to decoding. Since the whole subframe has to be received before the decoding can start, timing-wise this happens in the following subframe, in a pipelined fashion, while control information is received and decoded.

PDSCH is turbo encoded and it is decoded using the Data decoder which mainly comprises HARQ functionality with associated soft bit combiner, and a turbo decoder. The turbo decoder iterates the decoding until the received data is successfully decoded (as indicated by a successful cyclic redundancy check; CRC) or until running out of time (iterations). In case of failure to decode it may give up earlier if metrics indicate that not much more information is corrected in subsequent iterations, so called early give-up function (EGF). Due to the pipelined fashion of processing the turbo decoder has to finish within the duration of one subframe.

Feedback on whether data was successfully decoded or not (ACK/NACK; DL A/N) is provided to the network node in subframe n+4, where subframe n is the subframe where the data was received.

The CSI reporting may be either periodical, by which the UE knows beforehand when it is to be reported, but may also be a periodical by which the UE gets informed in the DCI that a CSI report is to be sent in subframe n+4.

The processing time for the OFDM demodulator, Channel Estimator, Combining weight calculator, Combiner and demapper, and Control decoder is highly dependent on the bandwidth in use, whereas the processing time for the Data decoder mainly depends on the UE category which is dictating the size of the HARQ buffers.

When the UE has received an SG in subframe n, it is to transmit on the physical uplink shared channel (PUSCH) in subframe n+4. Scheduling requests (SR), DL A/N, and CSI constitute the uplink control information (UCI) which is encoded by the UCI encoder. Data to be transmitted is encoded by the Data encoder which carriers out Turbo encoding, and then UCI is inserted. The modulation symbols are fed to the Block mapper, which maps the modulation symbols and uplink reference symbols, produced by UL RSIG generator, to the granted allocation. The resulting sequences of symbols are fed to the SC-FDMA modulator which essentially carries out an IFFT, and the output is sent to the radio.

In case no scheduling grant is received but the UE is to provide UL A/N, CSI and SR, the information is transmitted on the physical uplink control channel (PUCCH) according to a predefined format.

The processing time for UL RSIG generator, Block mapper, and SC-FDMA modulator is highly dependent on the bandwidth in use, whereas the processing time for Data encoder is depending on the UE category.

Further, due to timing advance, TA, and the standard stipulating that cell radius up to 100 km shall be supported, the uplink subframe n may have to be transmitted 0.67 ms before downlink subframe n has been received. Hence the UE will have to be able to do all data- and CSI-related processing of a subframe within roughly 2 ms, to meet the times for DL A/N, acting on aperiodic CSI reporting requests, acting on UL A/N from network node, etc.

It shall be noted that due to cost and power effectiveness a UE is generally designed with just the processing capacity, memory size, etc. needed for the supported features and capabilities, e.g. number of DL and UL carriers, respectively, and supported bandwidth for each of them. This is reflected e.g. by that the FFTs and IFFTs are designed to meet the deadlines on OFDM symbol basis, but not much quicker.

Figure 14:
FIG. 14 is illustrating a radio network node and a wireless device.

FIG. 14 illustrates a communication system comprising an eNodeB 20, and a UE 10. In this example, eNodeB 20 transmits a transport block to UE 10, whereby the UE acknowledges successful reception upon successful decoding. In accordance with the proposed solutions eNodeB 20 transmits one or more probing blocks during mot subsequent several timeslot(s) and the UE acknowledges the receipt and successful decoding of such probing blocks. Thereby eNodeB 20 receives information about the physical layer PHY and may reconfigure the transmission properties for transport blocks scheduled to be transmitted subsequently. In the same way, UE 10 can transmit at predetermined timeslot one or more probing packets using specific transmission properties, which are decoded upon reception at eNodeB. Consequently, eNodeB is enabled to tune the transmission properties for the UL and the DL to a less robust level, but still maintain the requirement on reliability and latency.

An example for node operation and a method in accordance to one or more aspects is illustrated in FIG. 1. The method is performed in a transmitting node of a radio network for adjusting transmission properties associated with data transfer in subframes. In the example the subframes comprise a length of 8 ms. The transmitting node can comprise an eNodeB or a UE as the method covers both directions DL and UL. For example and with respect to FIG. 14, the transmitting node is implemented in eNodeB 20. EnodeB 20 communicates via a link transmitting control information and data in Downlink to UE 10. UE 10 also comprises a transmitting node being able to make use of the proposed method during transmission of data in Uplink. In step S101 a first transport block is transmitted using a transport of transmission properties from the transmitting node to the receiving node. Such transmission properties often include MCS, but may also comprise a Radio Access Technology, one or more Multiple Input Multiple Output transmission modes, a Beam forming, a Pre-coding Matrix, a Transmission Power, pre-distortion parameters and the like. Optionally, a second transport block is transmitted using the set of transport transmission properties in step S103.

The method proposes now to further transmit a dedicated probing block as step 102 after transmission of the first transport block. Said probing block uses a set of probing transmission properties, which comprise a reduced robustness in relation to the set of transport transmission properties. In other words, the set of probing transmission properties are more aggressive than the set of transport transmission properties. For example, the set of probing transmission properties may comprise a modulation and coding scheme, which is more aggressive and hence less robust than a modulation and coding scheme used in the transport transmission properties. More particular, the probing may be carried out by temporarily increasing the CQI-to-MCS mapping and transmitting a respective probing block using an increased MCS.

In step 104 the set of transport transmission properties are reconfigured for further data transfer using or based on information communicated by the receiving node indicative of a success of a decoding of the probing block by the receiving node. In this regard it is noted that successful decoding does not only refer to a reception of the block and the IQ symbols in accordance with the selected modulation type, but also forward error correction and the like in order to provide a final status to the link layer in the receiver chain. Depending on the status, the receiving node provides an ACK/NACK message to the transmitting node.

The reconfiguration may comprise an adjustment of at least a part of the transport transmission properties to match a respective part of the set of probing transmission properties. For example, the MCS of the transport transmission properties is adjusted to match the MCS used in the probing transmission properties. Alternatively, a part of the set of the transport transmission properties is adjusted such that the resulting transmission robustness is lower than the transmission robustness of the set of transmission properties used in step S101, but higher than the transmission robustness of the set of probing transmission properties. For example and referring to Table 2, transport transmission properties comprise an MCS corresponding to index 10, and during probing an index 12 was used. In this regard it is noted that the transmission robustness decreases towards higher indices in Table 2. After receiving an acknowledgement of successful decoding new transport transmission properties adjusted in step S104 comprise an MCS corresponding to index value 11 in Table 2. The new index 11 is then used for further data transmission as it still fulfills the requirement towards latency and quality.

It may be suitable in some embodiments to prepare the probing block with dedicated payload data as illustrated by the optional block 102a. Such payload data is also included in a transport block using the set of transport transmission properties and transmitted in step S101, for example. Then optionally, one or more further transport blocks are transmitted to the receiving node in step 102b. After sending one or more of the further transport blocks, the transmitting node evaluates in optional step 102c, if it has received an ACK/NACK message concerning a reception of the probing block. As stated earlier in LTE using the HARQ process, such acknowledgment message should be received in subframe n+4, wherein n is the time slot or subframe, in which the probing block was transmitted. If the acknowledgment message is not yet received, step 102b is repeated, otherwise,—upon positive decoding acknowledgment of the $1^{st}$ transport block—, the probing block using the payload created in step 102a is transmitted to the receiving node. The network node will utilize an available HARQ process for the transmission of the probing block. There shall be HARQ processes available since the $1^{st}$ set of transmission properties, i.e. the MCS is set in such manner that no HARQ retransmissions are needed except when carrying out probing.

As the payload in the probing block has already been successfully received and decoded by the receiving node, the probing block contains only redundant data and is not needed by the receiving node. The duplicates of decoded transport blocks will be removed by the UE by MAC or RLC, hence the retransmission of an already decoded block is not an issue for the UE. Additionally or alternatively, the transmission of the probing block can optionally also contain step 102f, in which instruction to discard the probing block after decoding is also transmitted to the receiving node.

Figure 2:
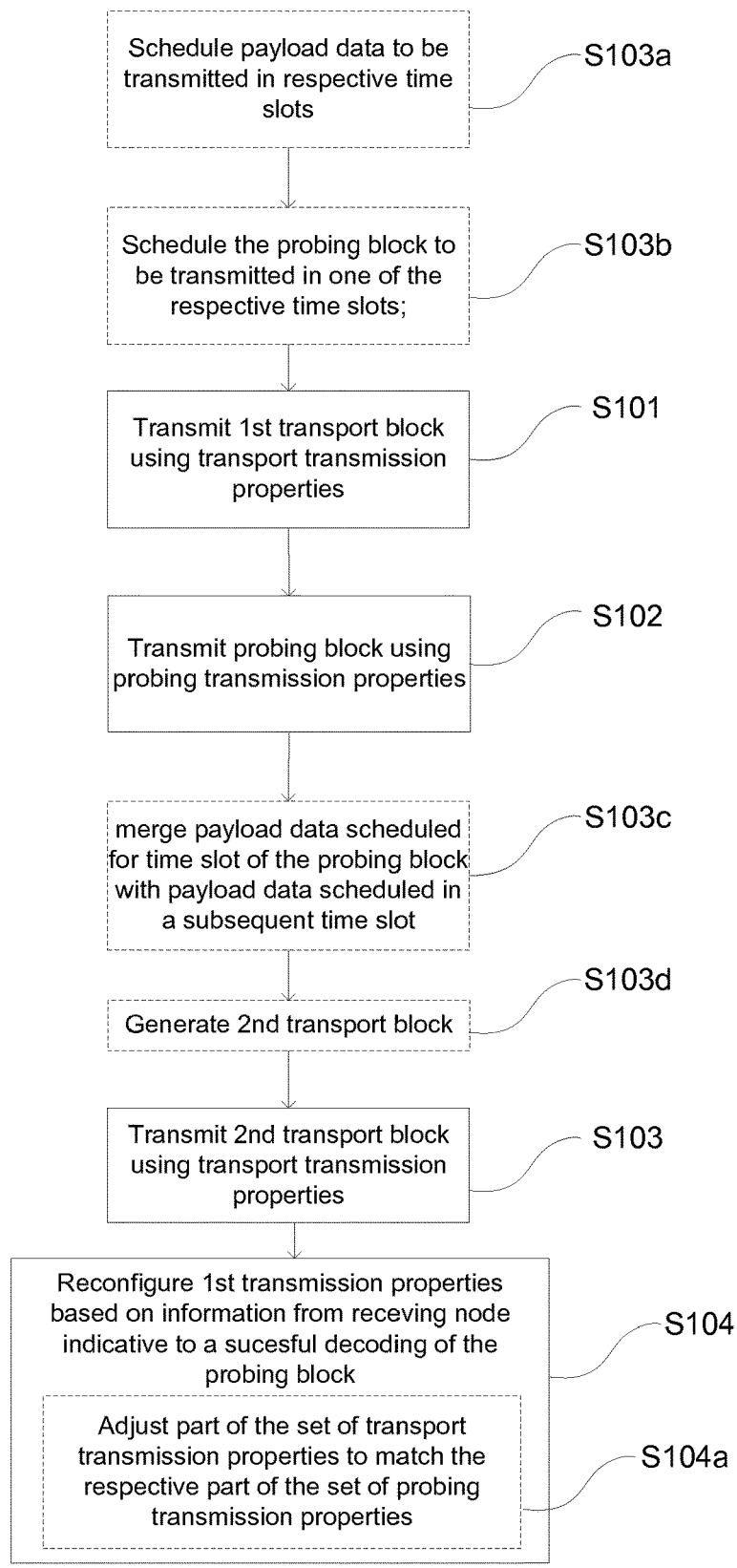
FIG. 2 shows another flowchart illustrating several method steps in a radio network.

FIG. 2 illustrate some further optional aspects of the proposed method. The transmitting node provides in step 103a a schedule of the payload data in transport blocks to be transmitted in respective time slots. Further in step S103b, the probing block is scheduled to be transmitted in a dedicated one of those time slots. That dedicated time slot for the probing block may actually be equal to one of the time slot, in which a transport block is scheduled to be transmitted. In other words, the scheduling of the transport blocks and the probing block results in a probing block and a transport block scheduled to be transmitted in the same time slot and as such in a scheduling conflict.

To solve this conflict, the payload data scheduled for the time slot had the probing block not been transmitted is merged with payload data scheduled to be transmitted in subsequent time slot. This merging, optionally shown in S103c therefore results in a transport block containing two payload data. The merging of payload data can be performed at any point in time, for example even prior to transmitting the $1^{st}$ transport block. After merging the payload, a transport block is generated therefrom in step S103d and transmitted as $2^{nd}$ transport block using the set of transport transmission properties. In this regard, more resources are allocated for the transmission of the $2^{nd}$ transport block, but other transport transmission properties, particularly the MCS will be the same as for the transmission of the $1^{st}$ transport block.

The process will introduce a small jitter and a delay of one time slot, but otherwise the transmission of transport blocks will be continuous. The method continues with step 104. As optional part of such reconfiguration, parts of the set of transport transmission properties are adjusted to match respective part of the set of probing transmission properties. As an example, the MCS of the transport block is reconfigured to match the MCS of the probing block in step S104a, if the information from the receiving node confirms a positive reception of the probing block(s) with said MCS. The transmitting node can then assume that a revised MCS still provides the robustness required by the receiving node.

Figure 3A:
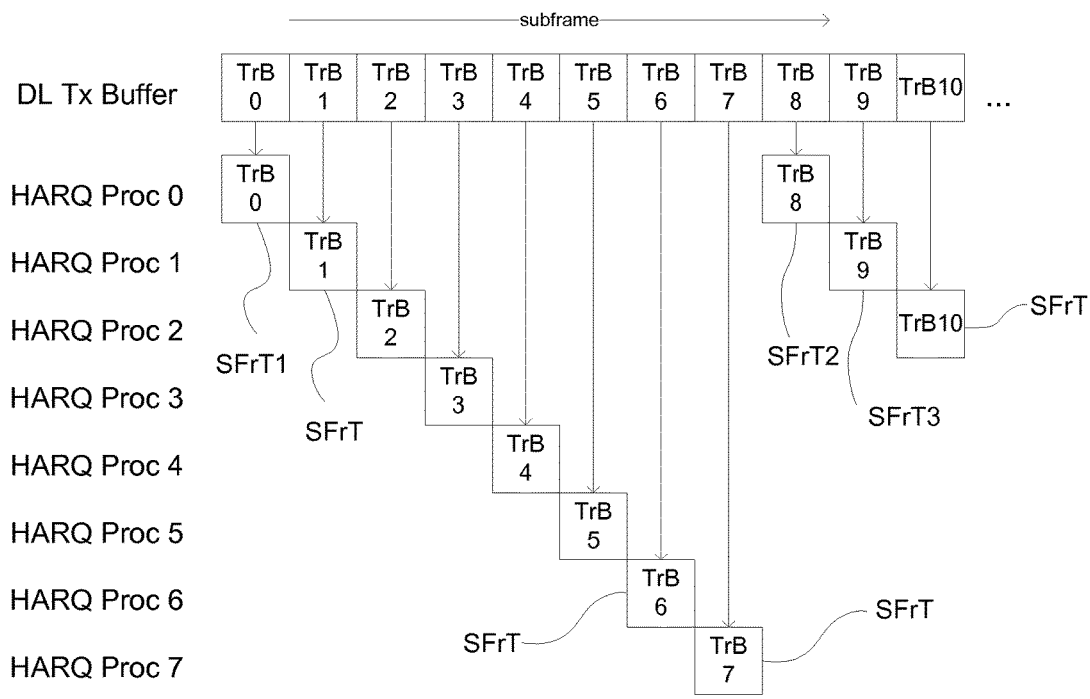
FIG. 3A illustrates a time diagram showing several subframes and transport blocks using a HARQ process.
Figure 3B:
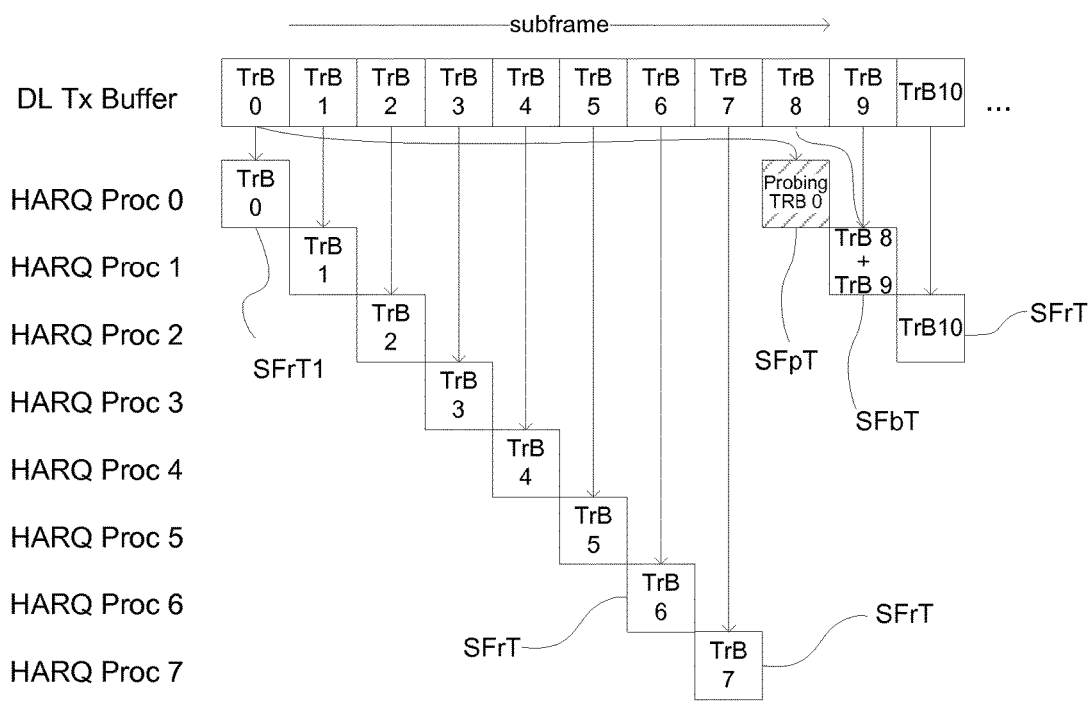
FIG. 3B illustrates another time diagram showing several subframes and transport blocks using a HARQ process.

FIGS. 3A and 3B illustrate a time diagram for transmitting blocks for an eNodeB to a UE node using HARQ processes. Each transport block SFrT with payload TRB 0 to TRB 10 is scheduled in a respective subframe in FIG. 3A. The respective transport block is assigned to one of 8 HARQ processes for transmitting, e.g. transport block SFrT with payload TRB 0 is assigned to HARQ process 0, payload TRB 1 is assigned to HARQ process 1 and so forth. The payload scheduled to be transmitted in subframes in DL Tx buffer are consequently split onto different HARQ processes in FIG. 3A and the transmitted using the set of transport transmission properties. FIG. 3B illustrate an example, in which a probing block SFpT is inserted using HARQ process 0. The probing block SFpT contains the same payload TrB 0 as the normally scheduled transport block SFrT1. The successful decoding of this transport block has been acknowledged by the receiving node (not shown in FIG. 3B). The same applies for transport block with payload TrB 1 in HARQ process 1.

HARQ process 0 is released and therefore can be used for transmitting the probing block SFpT using the set of probing transmission properties in the $8^{th}$ subframe. The payload TrB0 in probing block SFpT is known by the receiving node and will be discarded after decoding of the probing block (not shown). A feedback (not shown) from the receiving node back to the transmitting node provides information whether the set of probing transmission properties is suitable for further use. In addition, HARQ process 0 is released again and reused for transmission of normal transport blocks again.

However, when comparing with FIG. 3A, one notes that transport block SFrT2 with payload TrB8 was originally scheduled to be transmitted in said subframe, said subframe now used to transmit probing block SFpT. Consequently, payload TrB8 needs to be rescheduled and transmitted in a subsequent subframe. This can be achieved by merging payload TrB8 and payload TrB9 scheduled to be transmitted in a subsequent time slot into a new transport block SFbT. HARQ process 1 is used to transmit this transport block with the merged payload. The transmission will cause a jitter in the data flow by one subframe in the receiving node, but data flow on average is kept constant and no significant latency in the transmission is introduced.

In this example, the transport block immediately following the probing block is used for transmission of the merged payload. However, some other transport blocks might be suitable as well as long as reception and successful decoding of the payload missed due to transmission of the probing block is ensured within the time required by the UE. It is also possible to transmit the merged payload prior to transmitting the probing block.

Figure 4:
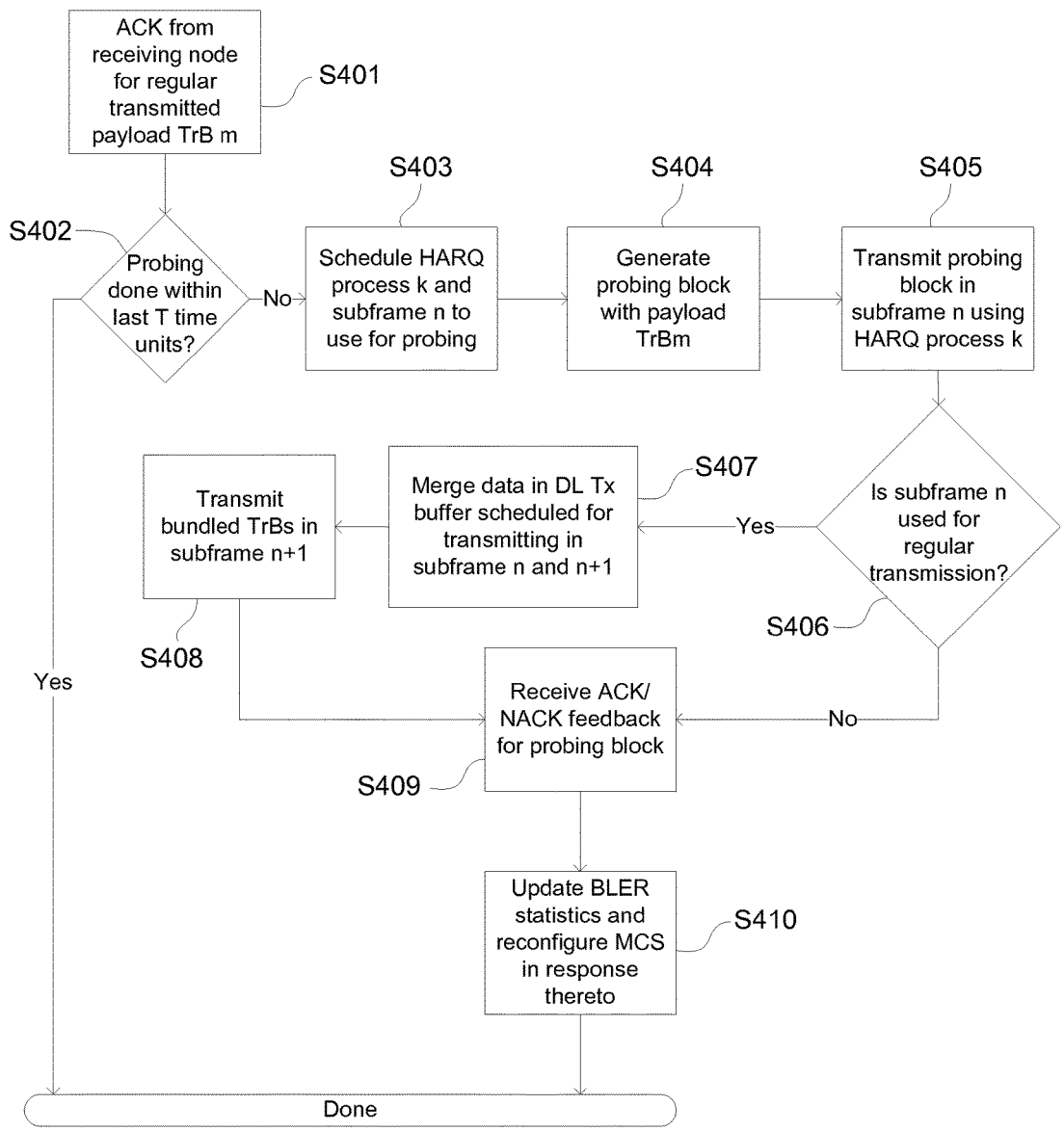
FIG. 4 shows a flow chart illustrating method steps performed in a radio network.

FIG. 4 illustrates another example of a method for adjusting the modulation and coding scheme MCS. A positive acknowledgment ACK for a successful decoding of payload TrBm is received in Step S401. As probing is performed periodically, step S402 evaluates if probing is done within a predetermined time period or within a number of subframes. If that is the case the process is terminated and repeated later. Otherwise, the method continues with step S403 by scheduling a HARQ process in a dedicated subframe n for transmitting a probing block. The probing block is generated (S404) using payload TrB m for which the positive acknowledgment ACK has been received in step S401, and then the probing block is transmitted in subframe n using the respective assigned HARQ process in step S405.

Further, it is evaluated in S406, whether subframe n is intended to be used for regular transport block transmission or if a transport block was/is scheduled for transmission in said subframe n. If this is not the case, the method waits for a feedback ACK/NACK from the receiving node in step S409. If, however a transport block was scheduled for regular transmission, the method continues with step S407, merging payload data in the DL originally schedule to be transmitted in transport blocks in subframes n and n+1. The merged payload is then transmitted in step S408 in the subframe n+1 as a normal transport block and the method continues with step S409. In response to the feedback, the BLER statistics for the probing block is updated and the MCS reconfigured if appropriate. The last step S410, particular the update of the BLER statistic prior to reconfiguring the MCS is optional, but might be suitable. The transmitting node normally has to ensure that less conservative transmission properties will not result in a higher BLER or any other risk affecting the latency requirements of the receiving node. Consequently, probing block with the set of probing transmission properties are transmitted a couple of times before a reconfiguration of the set of transport transmission properties takes place.

Figure 5:
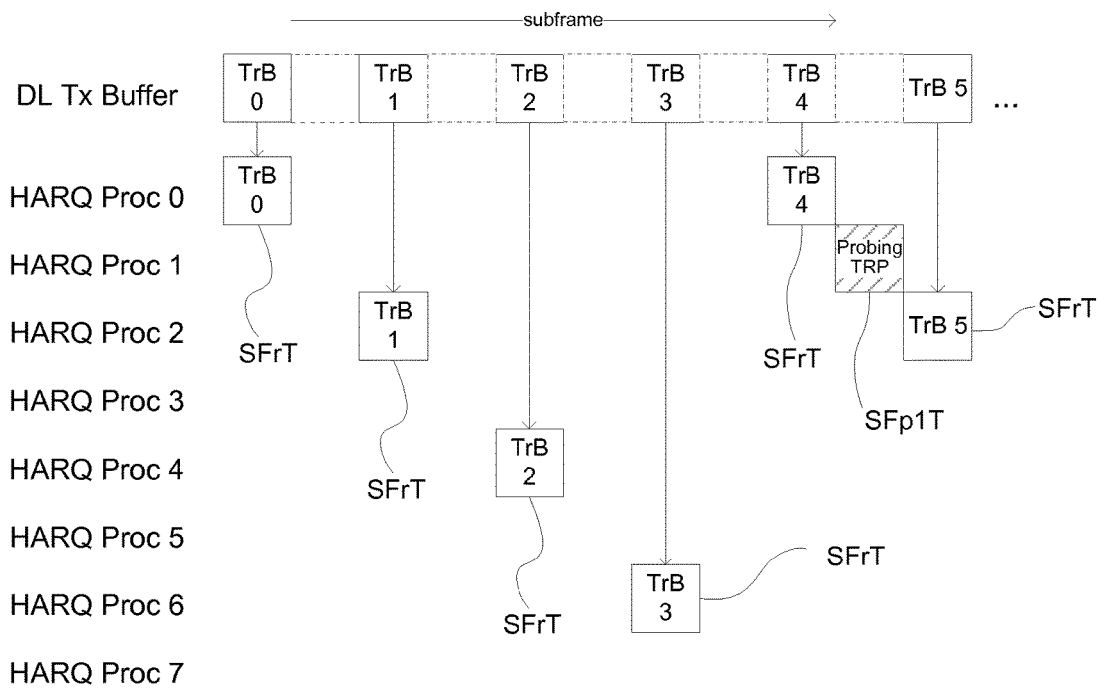
FIG. 5 illustrates another time diagram showing several subframes and transport blocks using a HARQ process.

FIG. 5 illustrates an example of transmitting a probing packet in an environment, in which a receiving node does not require to receive data more than once every k>1 subframes, although it may still have strict requirements on latency and reliability. In the illustrated example, the DL TX buffer comprises payload data TrB 0, . . . TrB 5 scheduled to be transmitted every second subframe (indicated by the dashed and dotted, empty boxes in the DL Tx buffer line). Consequently, only every second HARQ process is used for transmission, leaving the other HARQ processes unused. These unused HARQ processes can be used for the probing without causing any jitter in the transmission. For example, probing block SFp1T is scheduled for transmission using the previously unused HARQ process 1 during an otherwise unused subframe. Further, block SFp1T contains dedicated reference probing payload known to the receiving node. The transmission uses the set of probing transmission properties, for example a CQI-toMCS mapping, an MCS with lower robustness, less redundancies, other power levels and the like. It is possible to use all unused HARQ processes for the probing process, so relevant statistics regarding a successful decoding of probing blocks can be found quickly within a couple of frames. This is suitable under the assumption that the environment (i.e. noise, reflections, damping) does not change quickly to affect the probing statistics.

The previous examples are using the DL Tx buffer for transmitting the probing blocks. For transmission of transport blocks and/or probing blocks, the respective block contains is associated with an identifier enabling the receiving node to retrieve and decode the correct transport block. This unique identifier, called C-RNTI is provided by eNodeB and individually assigned to each UE in the network. In case it is critical to have the receiving node or UE to receive data every subframe, and the jitter would not be acceptable, the UE may support the decoding of two C-RNTIs simultaneously where one is used for the regular payload and another for dedicated probing payload.

Figure 6:
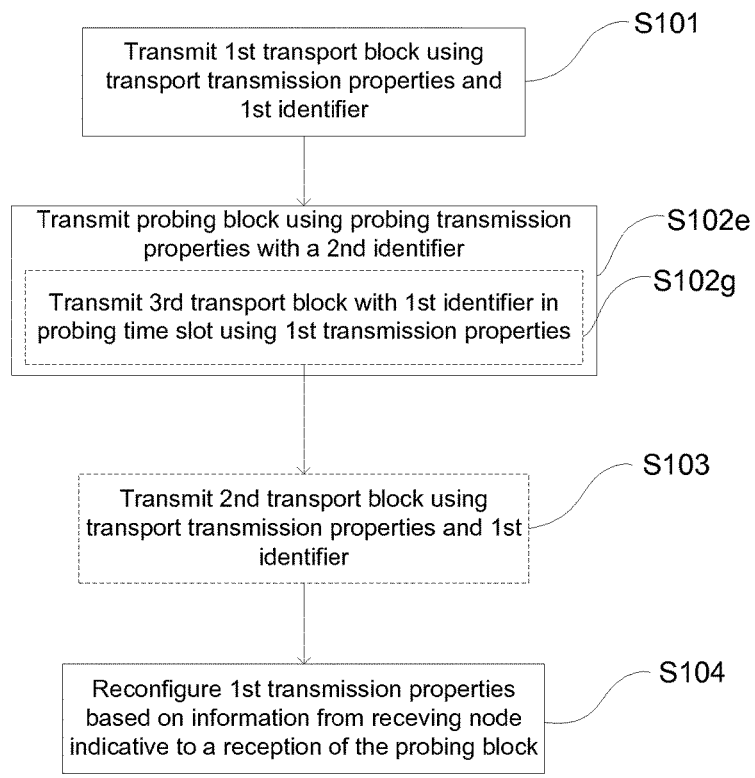
FIG. 6 shows a flow chart illustrating method steps performed in a radio network.

FIG. 6 illustrate an example of a respective method making use of more identifiers associated to the same receiving node. Two identifiers, e.g. two different C-RNTIs are assigned to the UE, whereby one identifier is used for the transport block and the second identifier is used for the probing blocks. In step S101 the $1^{st}$ transport block with payload data is transmitted. The $1^{st}$ transport block contains the $1^{st}$ identifier associated with the receiving node. The receiving node receives the transport block and decodes it in accordance with the identifier. In step S201e a probing block is transmitted. Said probing block contains a $2^{nd}$ identifier also associated with the receiving node. Optionally, the node also transmit a $3^{rd}$ transport block in step 102g using the first identifier and the set of transport transmission properties. In this regard it should be noted that the optional transmission of the $3^{rd}$ transport block and the probing block can very well occur simultaneously but also subsequently to each other. In case of a continuous transmission of transport blocks it may be useful to simultaneously transmit the probing block using a different $2^{nd}$ identifier associated with receiving node in order to ensure uninterrupted transmission of transport blocks. Method steps 103 and 104 are similar to the ones already described.

Figure 7:
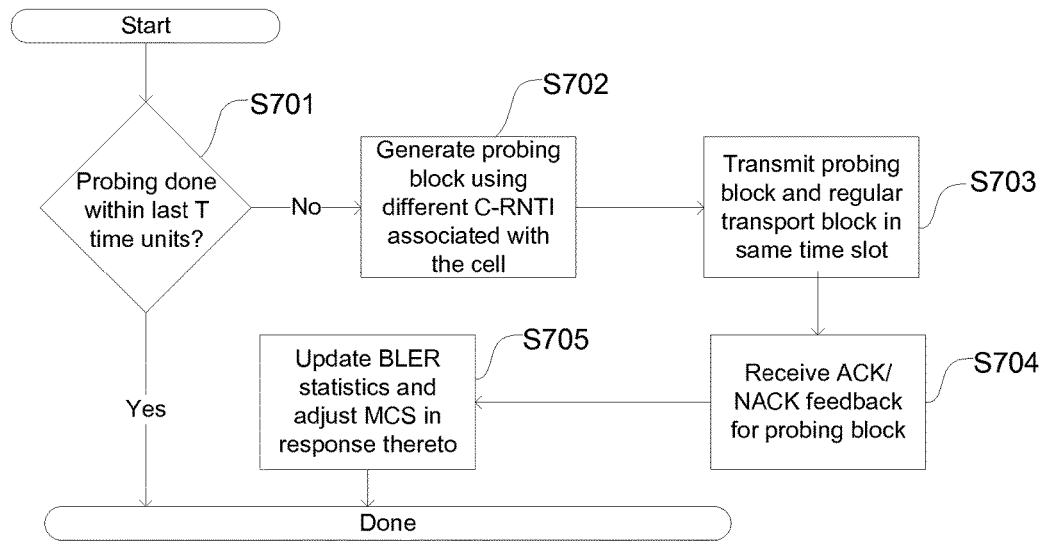
FIG. 7 shows a flow chart illustrating method steps performed in a radio network.

FIG. 7 shows a similar embodiment of the suggested method to use a $2^{nd}$ identifier associated with receiving node. The evaluation in step S701 checks whether a pre-specified amount of time has lapsed since the last probing and continues with step S702, if the evaluation returns true. The probing block is generated with a different C-RNTI associated with the receiving node (called cell in this case). The probing block and a regular transport block, the latter having a different identifier associated with the receiving node are transmitted during the same time in step S703. The transmitting node waits for a feedback in step S704 and updates in S705 the BLER statistic for the probing block accordingly. Based on the feedback and the statistics an adjustment of the transmission properties is performed, for example a MCS may be adjusted.

Figure 8:
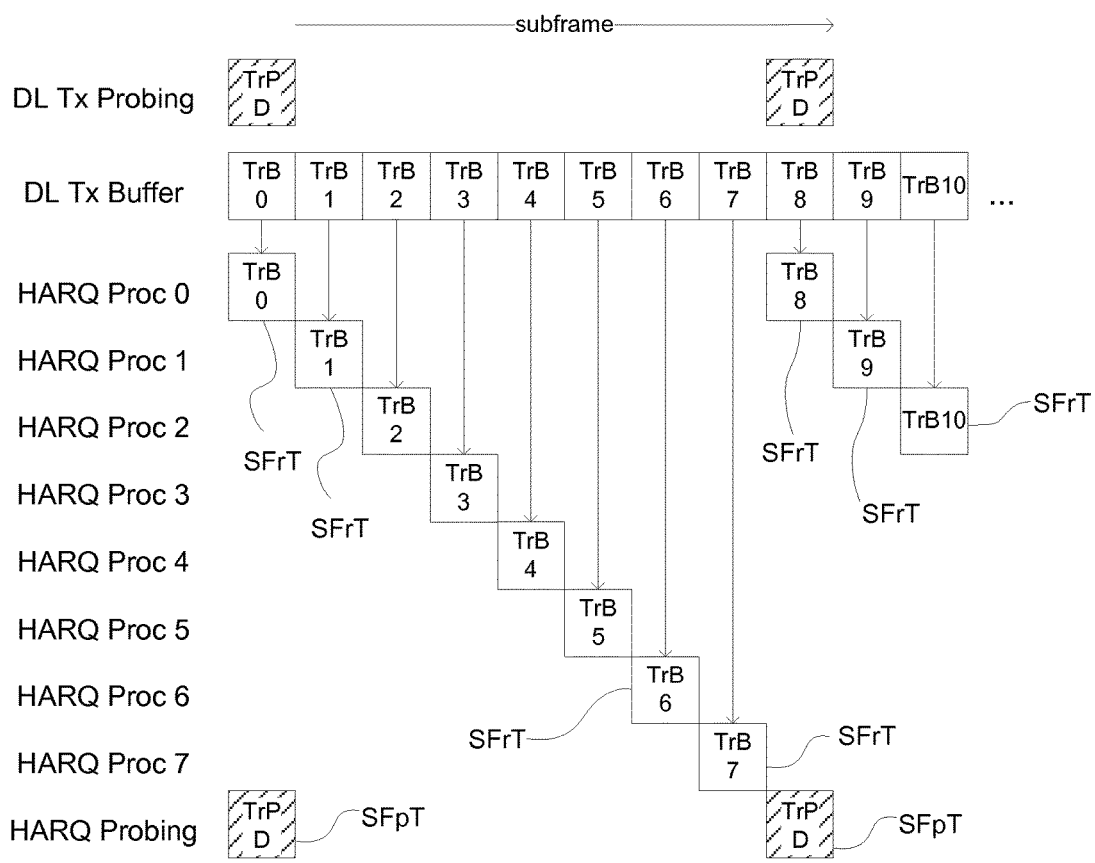
FIG. 8 illustrates another time diagram showing several subframes and transport blocks using a HARQ process.

For the purpose of transmitting a probing block with a $2^{nd}$ identifier, a dedicated probing HARQ process can be used. FIG. 8 illustrates a respective timing diagram. In this example, all regular HARQ processes are used or regular data transmission SFrT and the DL TX buffer is completely filled with payload data TrB scheduled to be transmitted continuously in subsequent subframes. At dedicated subframes probing blocks TrPD are scheduled to be sent using the dedicated HARQ probing process. The probing blocks are transmitted simultaneously to transport blocks SFrT using different identifiers than the transport blocks. The transmitting node may also receive feedback for probing blocks SFpT as well as for transmission blocks SFrT (not shown).

Figure 9:
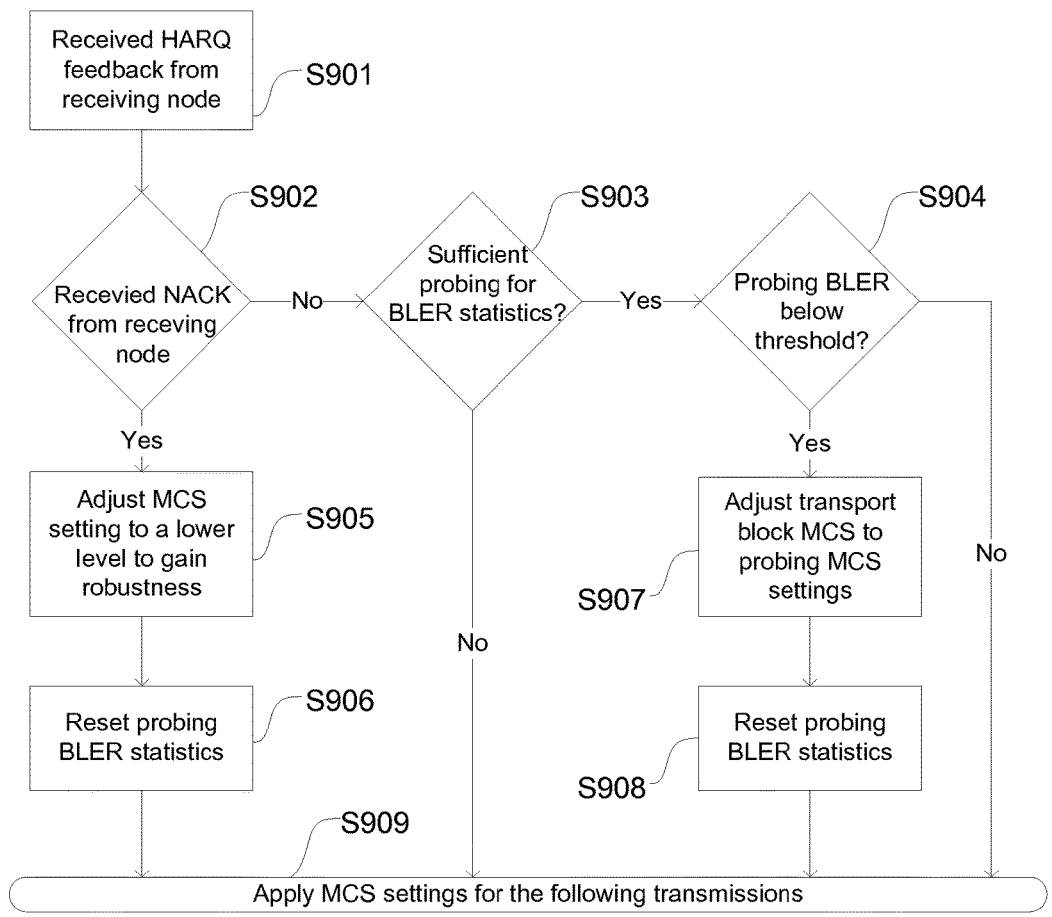
FIG. 9 shows a flow chart illustrating method steps performed in a radio network.

Optionally to the foregoing, the transmitting node may implement an evaluation process to reconfigure the set of transport transmission properties in response to the feedback regarding the transmission of the probing blocks. FIG. 9 illustrates by way of example an embodiment of such an approach, in which the modulation and coding scheme for transport packages is reconfigured. Of course other parameters of transmission properties can be readjusted accordingly using the illustrated approach. After receiving a HARQ feedback in step S901 from the receiving node, the result of the feedback is evaluated in step S902. If the feedback is a NACK, meaning that the corresponding probing block was not successfully decoded, the method continues with step S905. The NACK provided by the receiving node indicates that the MCS (or more general the transmission properties) of the transmitted probing block is not robust enough to ensure an error-free transmission (or more general the chosen transmission properties for the probing block may not fulfill the latency and BLER requirements). Consequently, the transmission properties, e.g. the MCS is adjusted to a more conservative or lower level for the upcoming probing blocks in order to gain robustness and/or an improved BLER. Further, the probing BLER statistics is reset in step S906 to reflect the adjusted settings. If on the other hand, the evaluation indicates a successful transmission (ACK in the feedback), the method continues with step S903 to evaluate, whether the current BLER statistics for the probing blocks has sufficiently large base to justify an adjustment of the transport transmission properties. If the evaluation is negative, the method continues with the current settings and applies those for the next probing block and transport block transmissions, step S909. In case the statistical data base is large enough, step S904 evaluates, if the BLER is below a certain threshold. The threshold in this regard may be depending on the requirement for low latency set forth or recommended by the receiving node. If the criteria outlined in step S904 are fulfilled, the transmission properties, e.g. the MCS value are adjusted also for transmission of transport blocks in S907. Consequently, future transport blocks will be transmitted using the updated but less robust CQI-MCS settings, as those settings still fulfill the requirements on BLER or latency as evaluated in S904. Again, the BLER statistic for the probing block is reset and the new settings are applied for future transport block transmission.

Figure 10:
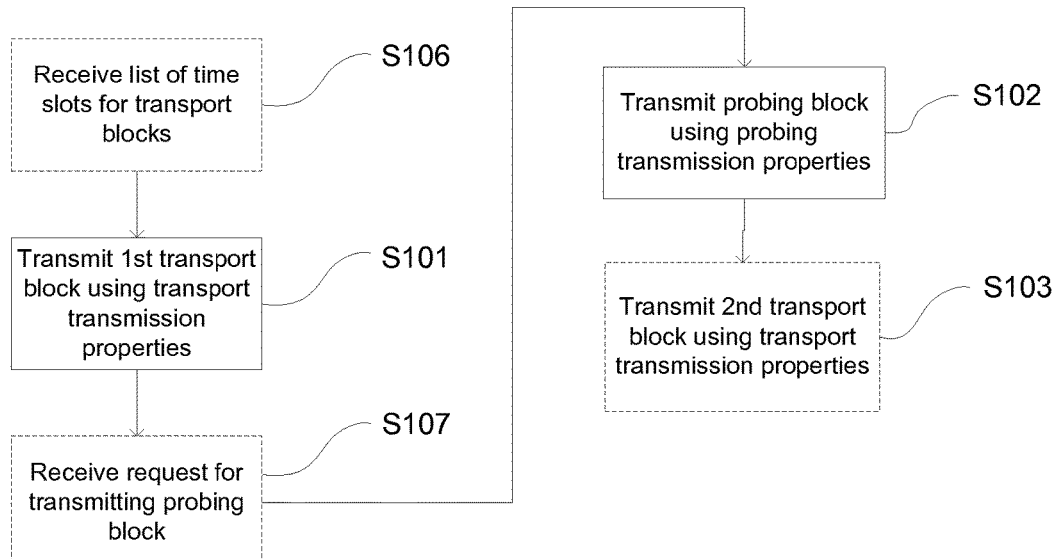
FIG. 10 shows a flow chart illustrating method steps performed in a radio network.

FIG. 10 shows another example of the method according to the present disclosure. Depending on the network standard, transmission of data or transport blocks may be allowed only during specific time slots. For example a UE in an LTE network is allowed to transmit only during dedicated time slots specified by eNodeB. Further, transmission properties are controlled by eNodeB and transmitted to the UE prior to transmission. Nevertheless, it is suitable for the eNodeB to retrieve information about the UL channel quality to save available resources. To this extent, eNodeB directs the UE to transmit probing packets with dedicated payload in specific time slots. Upon reception and decoding those probing packets, eNodeB retrieves information and may in response direct the UE to adjust its transmission properties for future transport blocks. In step S106, UE receives a list of time slots for transport blocks to be sent via the UL. In accordance with said list, a first transport block is transmitted using the set of transport transmission properties. The UE then receives a request to transmit a probing block. Such request can—as in this example in step S107— be received separately, but also be already included in the list of time slots in step S106. The request may not only contain information about when to transmit the probing block, but also the transmission properties for such probing block transmission. In response thereto, the UE transmits the probing block using the set of probing transmission properties in S102 and a $2^{nd}$ transport block in step S103. The probing block as well as the second transport block is transmitted using one or more of the techniques disclosed earlier.

Figure 11:
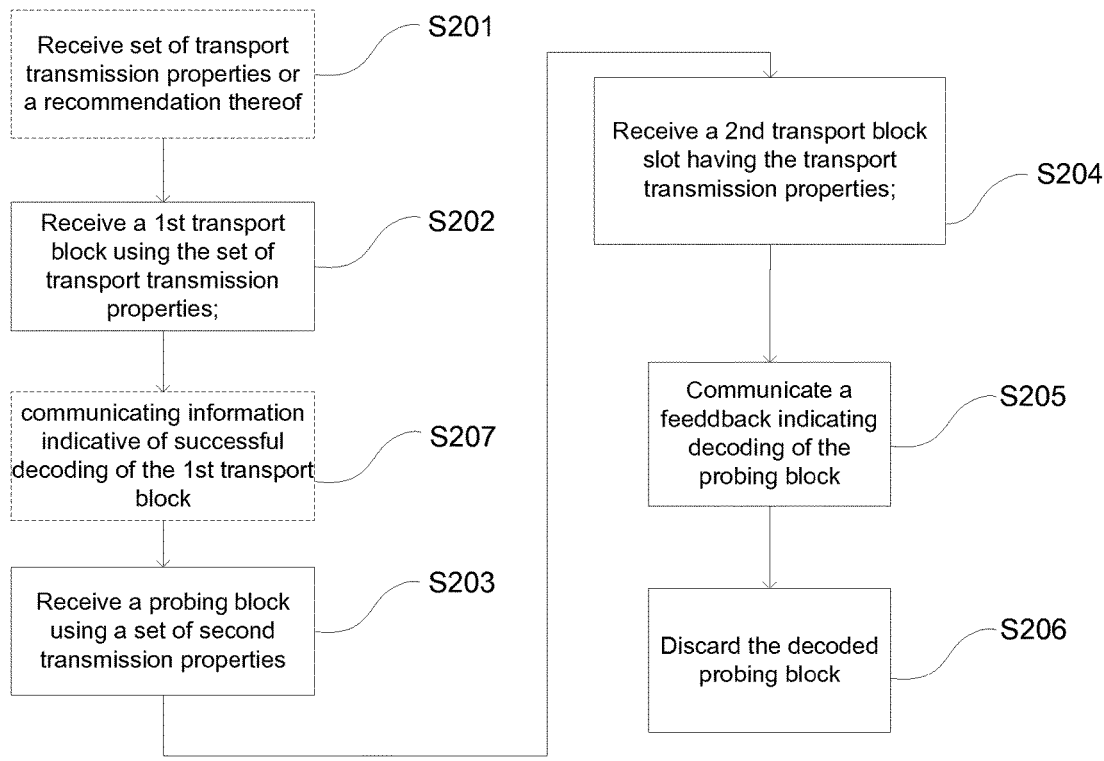
FIG. 11 shows a flow chart illustrating method steps performed in a radio network.

Another aspect of the present disclosure is related to a method of processing quality information on transport blocks in a receiving node of radio network. FIG. 11 illustrates a respective example. Optionally, the transmission properties for the transport blocks to be received are transmitted and received in step S201. Then, a $1^{st}$ transport block having the set of transport transmission properties is received in step S202. A probing block is received in step S203, said probing block having a set of probing transmission properties. It should be noted that the decoding process of the transport blocks and/or the probing block may take some time during which further transport and/or probing blocks are received. For this process the receiving node may also use HARQ or similar processes, including i.e. turbo decoding.

In the example of FIG. 11, the probing block is received in S207 after a transmitted feedback acknowledging the decoding of payload in the received $1^{st}$ transport block. This approach enables to receive payload data in the probing block which has already been successfully decoded. $2^{nd}$ and even further transport blocks (not shown) are received and decoded in step S204. The $2^{nd}$ transport blocks comprise the set of transport transmission properties. After some time, the probing block is fully decoded or the decoding process fails and a corresponding feedback is communicated back to the transmitting node in step 205. The probing block as well as any decoding results is discarded in S206, as the probing block is not used for data transfer itself, but rather for transmission properties probing.

It is noted that transmitting or receiving a first and respective $2^{nd}$ transport block also includes transmitting and/or receiving a plurality of such $1^{st}$ and $2^{nd}$ transport blocks. In this regard, it is assumed that a transport block makes use of an HARQ process, although it is not re-received, as the chosen transport transmission properties are conservative enough such that no retransmission is needed.

Figure 12:
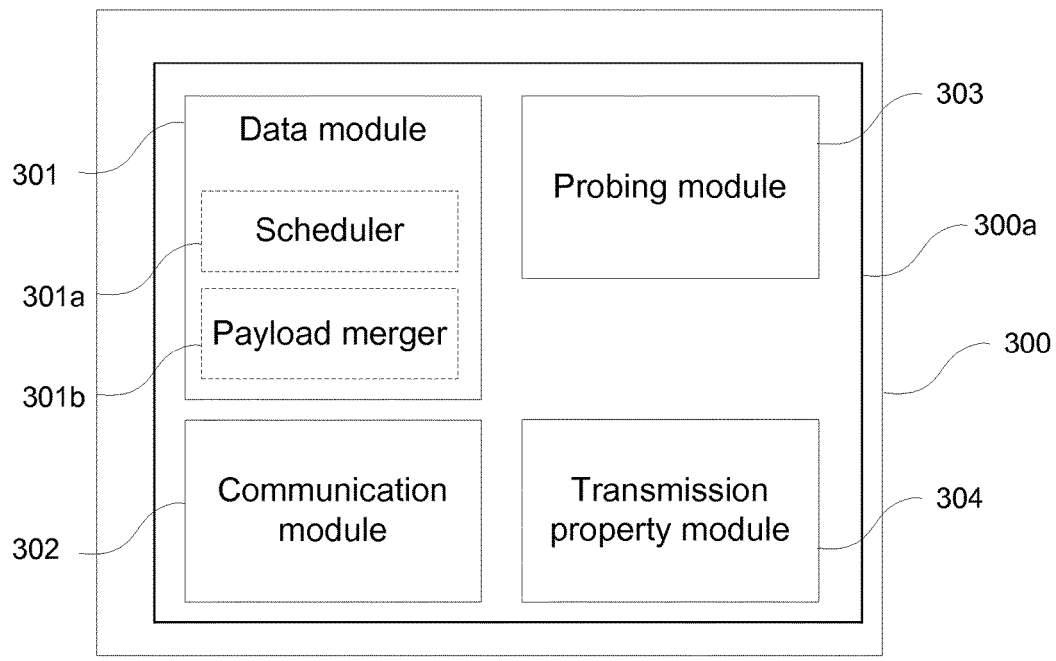
FIG. 12 illustrates an example node configuration of a transmitting node.

FIG. 12 illustrates an embodiment of a transmitting node as for example implemented in a base station or in a UE. The transmitting node comprises one or more processing circuitry, both baseband and HF components as well as memories and other hardware components. Functionalities are implemented as software, hardware or combinations thereof. For example, any functionality may be implemented by hardware components like memories, FFT units, modulators, amplifiers, filter and processing units but also software components, e.g. encoders or a combination thereof. The transmitting node shown in this example comprise several modules, which in return make use of or are implement in hardware, software and combinations thereof. In addition, the transmitting node can form an integral part of an eNodeB or a UE. By nature of such implementation, modules are implemented in different ways. Transmitting node 300 comprises, among other things, processing circuitry 300a including several modules interconnected and communicating with each other. Data module 301 is configured to provide the payload data and arrange it into one or more transport blocks for subsequent transmission by the communication module 302. Data module 301 also comprises a scheduler 301a and a payload merger 301b. The scheduler is configured to arrange the transport blocks to be transmitted in a dedicated order and assigns each block to specific subframes. The scheduler may also be responsible for providing the respective transport block to the communication module 302. Communication module 302 transmits the respective blocks provided by data module 301 and probing module 303 to the receiving node. Module 302 also receives any feedback or acknowledgment from the receiving node concerning the decoding of the blocks and processes the feedback.

Payload merger 301b is adapted to provide a merging of payload data, if payload data originally scheduled to be transmitted in subsequent time slot is now needed to be transmitted in the same time slot. The probing module 303, being part of processing circuitry 300a is configured to generate probing payload and provide a probing block for transmission. The transmission property module 304 selects the respective set of transmission properties both for the data and probing module or more particular for the transport blocks provided by the data module and the probing blocks provided by the probing module.

Figure 13:
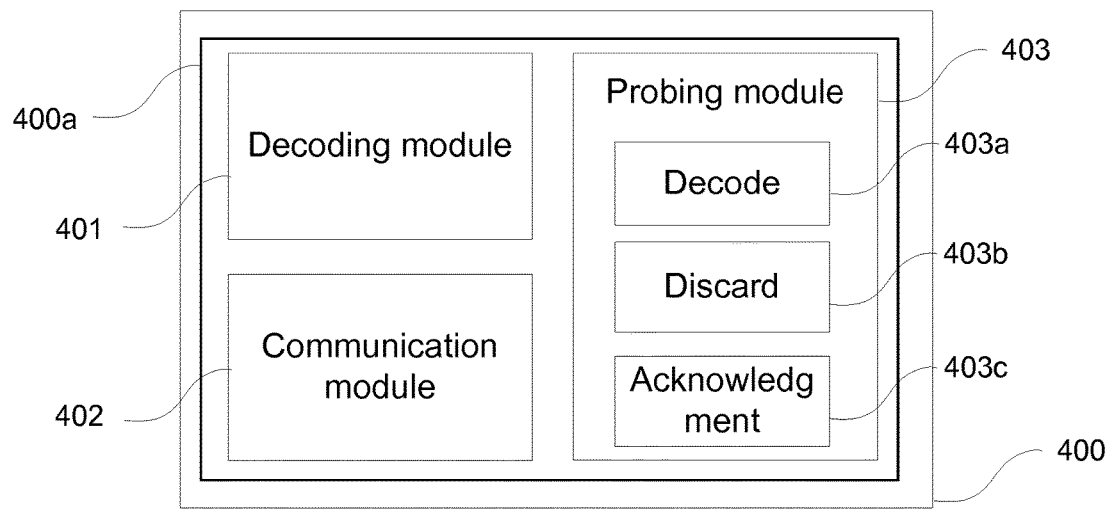
FIG. 13 illustrates an example node configuration of a receiving node.

FIG. 13 shows an embodiment of a receiving node. The receiving node can be implemented in a base station, eNodeB of a radio network, but also in a mobile device or UE. Similar to the transmitting node, the receiving node comprises one or more processing circuitry, both baseband and HF as well as memories and other hardware components. Functionalities of the receiving node are implemented as software, hardware or combinations thereof. For example, communication functionality may comprise hardware components like memories, FFT units, modulators, amplifiers, filter and processing units but also software components, e.g. encoders.

The receiving node 400 comprises one or more processing circuitry 400a implementing different modules to operate in accordance with the proposed principle. Communication module 402 is configured to receive transport and probing blocks over a radio network link from a transmitting node and relay the received blocks to respective decoding and probing modules. It may evaluate any identifier included or associated with the received transport and probing blocks to initiate the relay. In case different identifiers are used for the transport block and the probing block, communication module 402 may use this information to forward the respective blocks to the transport and the probing module, respectively.

Communication module 402 is also configured to transmit a feedback to the transmitting node regarding the results of the decoding process performed by the probing module 403 and the decoding module 401. Decoding module 401 is configured to retrieve a transport block from communication module 402 and decode the block to obtain payload data included therein. For this purpose, decoding module 401 uses information related to the transmission properties associated the respective transport block. If the transport block for example used a specific modulation and coding scheme for encoding the payload, the decoding module uses the appropriate scheme to decode the payload data contained in the transport block. The transmission properties required for decoding can be transmitted within the respective transport block, parallel in some form of control information or otherwise made available to the decoding module. The decoding module 401 is also configured to provide a feedback to the communication module stating the result of the decoding process. The feedback ACK/NACK is transmitted by communication module 402 back to the transmitting node, which may depending on the result trigger a retransmission or transmission of a new transport block.

The probing module 403 is configured to retrieve probing blocks and to decode said blocks. The probing blocks comprise different transmission properties, for example a different MCS compared to the transport blocks received by node 400. As for the transport blocks, any information required to decode the payload of the probing blocks can be included in the probing blocks itself or send in parallel in control information. Probing module 403 therefore comprises a decoding sub-module 403a retrieving the probing block having the set of probing transmission properties. Decoding requirements, e.g. a specific MCS associated with the set of probing transmission properties are used to obtain the payload. Decoding sub-module 403a also evaluates the result of the decoding process, i.e. checks whether the probing block has been successfully decoded. The decoded payload may comprise dedicated data particularly suitable for probing blocks or payload of a previous or subsequently received transport block. In any case the decoded data is discarded by sub-module 403b. In case of errors during the decoding process, sub-module 403b may include functionality for an analysis why the decoding process has failed. Such information can be send back to the transmission node to adjust the transmission of subsequent probing blocks. Probing module 403 also comprises an acknowledgment sub-module retrieving the results from decoding sub-module 403a and the discard sub-module 403b to prepare a respective feedback message. Said feedback message is forwarded to the communication module 402 to be communicated back to the transmitting node.

The invention claimed is:

1. A method performed in a transmitting node of a radio network for adjusting transmission properties for data transfer, the method comprising:
   transmitting a first transport block to a receiving node using a set of transport transmission properties;
   transmitting a probing block to the receiving node using a set of probing transmission properties resulting in a reduced transmission robustness in relation to the set of transport transmission properties used for the first transport block;
   reconfiguring the set of transport transmission properties for further transport blocks based on information communicated by the receiving node indicative of success of decoding of the probing block by the receiving node.

2. The method according to claim 1, further comprising at least one of:
   transmitting a second transport block using the set of transport transmission properties reconfigured after transmitting the probing block and
   receiving information indicative of successful decoding of the first transport block.

3. The method according to claim 1, wherein reconfiguring comprises adjusting at least a part of the set of transport transmission properties to match a respective part of the set of probing transmission properties.

4. The method according to claim 1, wherein reconfiguring comprises adjusting at least a part of the set of transport transmission properties to cause a transmission robustness which is lower than a transmission robustness of the set of transport transmission properties used in transmitting the first transport block but higher than the reduced transmission robustness of the set of probing transmission properties.

5. The method according to claim 1, wherein at least one of the set of transport transmission properties and the set of probing transmission properties comprise one or more of:
   a modulation and coding scheme
   a Radio Access Technology, one or more Multiple Input Multiple Output transmission modes,
a Beam forming,
a Pre-coding Matrix
a Transmission Power.

6. The method according to claim 1, wherein the probing block comprises payload data that is also included in a transport block transmitted using the transport transmission properties.

7. The method according to claim 6, further comprising:
prior to transmitting the probing block, receiving a communication by the receiving node indicative of a successful decoding of the transport block comprising the payload data of the probing block.

8. The method according to claim 2, further comprising:
scheduling payload data to be sent in transport blocks in respective time slots;
scheduling the probing block to be transmitted during a particular time slot of the respective time slots;
merging the payload data scheduled during the particular time slot with payload data scheduled in a subsequent time slot of the respective time slots; and
generating the second transport block using the merged payload.

9. The method according to claim 8, wherein merging the payload data comprises merging the payload data scheduled in the particular time slot with payload data scheduled in a time slot immediately following the particular timeslot.

10. The method according to claim 2, wherein the probing block is transmitted immediately after transmitting the first transport block and/or immediately before transmitting the second transport block.

11. The method according to claim 1, further comprising the step of:
transmitting a third transport block during a time period in which the probing block is transmitted.

12. The method according to claim 1, wherein each of the first and further transport blocks comprises a first identifier associated with the receiving node, and the probing block comprises a second identifier associated with the receiving node.

13. The method according to claim 1, wherein transmitting the probing block comprises transmitting an instruction to discard said probing block after acknowledging reception of said probing block.

14. The method according to claim 1, wherein the probing transmission properties are selected in response to a required Block Level Error Rate, said required Block Level Error Rate biased to a Block Level Error Rate in a channel quality indicator communicated by the receiving node.

15. The method according to claim 2, wherein transmission of at least one of the first transport block, the second transport block, and the probing block uses Hybrid Automatic Repeat Request technique for error correction of transmitted packets.

16. The method according to claim 1, wherein the probing block is transmitted in response to a request by the receiving node.

17. The method according to claim 1, wherein the transmitting node is a user device, particular a wireless device, and further comprising:
receiving a list of scheduled time slots during which at least one of the first transport block, the second transport block, and the probing block is to be transmitted.

18. The method according to claim 1, wherein the first transport block, the second transport block, and the probing block are transmitted on the physical downlink shared channel (PDSCH) or the physical uplink shared channel (PUSCH).

19. A method performed in a receiving node of radio network for processing quality information on transport blocks, the method comprising the steps of:
receiving a first transport block using a set of transport transmission properties;
receiving a probing block, said probing block using a set of probing transmission properties having a reduced transmission robustness in relation to the set of transport transmission properties used for the first transport block;
communicating an acknowledgment in response to decoding of the probing block; and
discarding the decoded probing block.

20. The method according to claim 19, further comprising at least one of the steps of:
communicating information indicative of successful decoding of the first transport block; and
receiving a second transport block using the set of transport transmission properties, wherein the probing block is received after receiving the first transport block but before receiving the second transport block.

21. The method according to claim 19, further comprising receiving the set of transport transmission properties or a recommendation thereof prior to receiving the first transport block.

22. The method according to claim 19, wherein the probing block comprises payload data that is included in a transport block using the set of transport transmission properties.

23. The method according to claim 22, further comprising:
receiving the transport block comprising the payload data prior to receiving the probing block comprising the payload data; and
transmitting, prior to receiving said the payload data in the probing block, an acknowledgment for the payload data received in the transport block.

24. The method according to claim 19, wherein the probing packet is received immediately after receiving the first transport block or immediately before receiving the second transport block.

25. The method according to claim 20, wherein receiving the first transport block, the second transport block, and the probing block comprise decoding payload data using Hybrid Automatic Repeat Requests for error correction.

26. The method according to claim 20, wherein the second transport block comprises merged payload data, said merged payload data comprising payload data scheduled for transmission during a time period in which the probing block was transmitted and payload data scheduled for transmission after the transmission of the probing block.

27. The method according to claim 19, further comprising the step of:
receiving a third transport block using a set of transport transmission properties during a time period in which the probing block is received.

28. The method according to claim 20, wherein each of the first and second transport blocks comprises a first identifier associated with the receiving node, and the probing block comprises a second identifier associated with the receiving node.

29. The method according to claim 19, wherein the first transport block, the second transport block, and the probing block are received on the physical downlink shared channel (PDSCH) or the physical uplink shared channel (PUSCH).

30. A non-transitory, computer-readable medium comprising program instructions that, when executed in a programmable controller of a node in a radio network, causes said node to perform the method according to claim 1.

31. A transmitting node in a radio network comprising:
processing circuitry comprised of at least one processing unit and at least one memory, wherein the processing circuitry is configured as a plurality of modules including:
a data module configured to provide a first and a second transport block comprising payload data using a set of transport transmission properties;
a probing module configured to provide a probing block using a set of probing transmission properties, said probing transmission properties having a reduced transmission robustness in relation to the set of transport transmission properties;
a communication module configured to transmit the first and second transport blocks and the probing block in between the transmission of the first and second transport blocks to a receiving node;
a transmission property module configured to reconfigure the set of transport transmission properties in response to a success acknowledgment for decoding of the probing block provided by the receiving node.

32. The transmitting node according to claim 31, wherein the transmission property module is configured to adjust at least a part of the set of transport transmission properties to match a respective part of the set of probing transmission properties.

33. The transmitting node according to claim 31, wherein the transmission property module is configured to adjust at least a part of the set of transport transmission properties to cause a transmission robustness which is lower than a transmission robustness of the set of transport transmission properties used in transmitting the first transport block but higher than a transmission robustness of the set of probing transmission properties.

34. The transmitting node according to claim 31, wherein the probing module is configured to provide the probing block comprising payload data included in at least one of the first and second transport block.

35. The transmitting node according to claim 34, wherein the communication module is configured to transmit the probing block after reception of a positive acknowledgment of a transport block containing said payload data by the receiving node.

36. The transmitting node according to claim 31, wherein the data module comprises
a scheduler configured to schedule payload data to be sent in respective time slots and
a merger configured to merge payload data scheduled to be transmitted in the time slot in which transmission of the probing data is scheduled and payload data scheduled in a subsequent time slot, particular in the time slot immediately following the transmission of the probing data, and to provide a transport block comprising said merged payload data.

37. The transmitting node according to claim 31, wherein the data module is configured to provide transport block(s) having a first identifier associated with the receiving node;
the probing module is configured to provide the probing block having a second identifier associated with the receiving node.

38. The transmitting node according to claim 31, wherein the communication module is configured to transmit a third transport block and the probing block during the same time.

39. The transmitting node according to claim 31, wherein the communication module is configured to transmit the probing block immediately prior or after a transport block comprising the same payload data as the probing block.

40. The transmitting node according to claim 31, wherein the probing module is configured to provide a request to the receiving node to discard the probing block after communicating a decoding acknowledgment.

41. The transmitting node according to claim 31, wherein the transmission property module is configured to trigger the probing module to provide probing blocks and to provide transport and the probing transmission properties in response to a respective request by the receiving node.

42. The transmitting node according to claim 31, wherein the set of first and/or probing transmission properties comprise at least one of:
a modulation and coding scheme,
a Radio Access Technology,
one or more Multiple Input Multiple Output transmission modes,
a Beam forming,
a Pre-coding Matrix
a Transmission Power.

43. The transmitting node according to claim 31, wherein the transmitting node is implemented in a base station or a wireless user device.

44. A receiving node in a radio network comprising:
processing circuitry comprised of at least one processing unit and at least one memory, wherein the processing circuitry is configured as a plurality of modules including:
a decoding module configured to decode a first transport block and a second transport block, using a set of transport transmission properties, to retrieve payload data;
a probing module configured to:
decode a probing block using a set of probing transmission properties having a reduced transmission robustness in relation to the set of transport transmission properties,
discard the probing block after decoding, and
provide an acknowledgment indicative to a decoding result of the probing block;
a communication module configured to receive the first and second transport blocks and the probing block in between the first and second transport blocks from a transmitting node and transmit the acknowledgment to said transmitting node.

45. The receiving node according to claim 44, wherein the probing block is associated with an identifier different than an identifier associated with the first and second transport blocks.

46. The receiving node according to claim 44, wherein the receiving node is implemented in a base station or a wireless device.

* * * * *